(12) United States Patent
Matsuo et al.

(10) Patent No.: US 6,345,869 B1
(45) Date of Patent: Feb. 12, 2002

(54) BRAKE CYLINDER PRESSURE CONTROL APPARATUS WITH CONTROLLER FOR CONTROLLING PRESSURIZING DEVICE BASED ON OPERATING STATE OF PRESSURE CONTROL VALVE DEVICE

(75) Inventors: Yoshiaki Matsuo, Shizuoka-ken; Kiyotaka Motoyoshi, Aichi-ken, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/672,019

(22) Filed: Sep. 29, 2000

(30) Foreign Application Priority Data

Oct. 4, 1999 (JP) ............................................. 11-282602
Nov. 2, 1999 (JP) ............................................. 11-312629

(51) Int. Cl.$^7$ ................................................. B60T 8/44
(52) U.S. Cl. ............................. 303/116.1; 303/113.1; 303/115.1; 303/162; 303/119.2; 303/DIG. 4
(58) Field of Search .......................... 303/116.1, 10, 303/113.5, 115.1, 115.4, 117.1, 119.1, 156–159, 113.1, 119.2, 113.2, 15, 162, DIG. 11, DIG. 3, DIG. 4, 900, 901, 186, 3, 113.4, 139, 140, 148, 166; 60/562, 547.1; 701/71, 80

(56) References Cited

U.S. PATENT DOCUMENTS 5,797,663 A * 8/1998 Kawaguchi et al. .......... 303/146

FOREIGN PATENT DOCUMENTS

| JP | 2-169355 | 6/1990 |
| JP | 11-123604 | 5/1999 |

* cited by examiner

Primary Examiner—Douglas C. Butler
(74) Attorney, Agent, or Firm—Oliff & Berridge, PLC

(57) ABSTRACT

A braking pressure control apparatus for a braking system having brake cylinders including a pressurizing device capable of pressurizing a working fluid and controlling a pressure of the pressurized fluid, a plurality of pressure control valve devices each of which is disposed between the pressurizing device and at least one of the brake cylinders and is operable to control flows of the fluid between the pressurizing device and the corresponding at least one brake cylinder, for thereby regulating the fluid pressure in the corresponding at least one brake cylinder, and a pressurizing-device control device operable to control the pressurizing device for controlling an output pressure of the pressurizing device on the basis of an operating state of each of the pressure control valve devices, which operating state determines the state of fluid flow between the pressurizing device and the corresponding at least one brake cylinder.

21 Claims, 11 Drawing Sheets

[IN OFF STATE OF OIL 84]

[IN ON STATE OF COIL 84]

| SLIPPING TENDENCY INCREASED | DECELERATION INCREASED ← | | |
|---|---|---|---|
| | G<G1 | G1≦G≦G2 | G2<G |
| Sw1<Sw | REDUCE | HOLD | HOLD |
| Sw2≦Sw≦Sw1 | REDUCE | HOLD | INCREASE |
| Sw<Sw2 | HOLD | HOLD | INCREASE |

BRAKE CYLINDER PRESSURE CONTROL APPARATUS WITH CONTROLLER FOR CONTROLLING PRESSURIZING DEVICE BASED ON OPERATING STATE OF PRESSURE CONTROL VALVE DEVICE

This application is based on Japanese Patent Application Nos. 11-282602 filed Oct. 4, 1999 and 11-312629 filed Nov. 2, 1999, the contents of which are incorporated hereinto by reference.

BACKGROUND OF THE INVENTION

1. Field of the Invention

The present invention relates to a braking pressure control apparatus including a pressurizing device in a braking system.

2. Discussion of Related Art

Japanese Patent Application No. 11-123604 which was filed by the assignee of the present application and which has not been published discloses an example of such a braking pressure control apparatus equipped with a pressurizing device. The braking pressure control apparatus disclosed in this application includes (1) a pressurizing device operable to pressurize a working fluid and control the pressure of the pressurized fluid to a desired value, (2) a plurality of pressure control valve devices each of which is disposed between the pressurizing device and at least one of a plurality of brake cylinders in the braking system and is operable to control flows of the fluid between the pressurizing device and the corresponding at least one brake cylinder, for thereby regulating the fluid pressure in each of the corresponding at least one brake cylinder, and (3) a pressurizing-device control device for controlling the pressurizing device to control the pressure of the fluid pressurized by the pressurizing device according to an operating state of a brake operating member. In the braking pressure control apparatus disclosed in the above-identified application, the pressure of the fluid delivered from the pressurizing device is controlled according to the operating state of the brake operating member, and each pressure control valve device is controlled to control the fluid pressure in each of the corresponding at least one brake cylinder in an anti-lock pressure control fashion, for example, such that the slipping state of each of a plurality of vehicle wheels corresponding to the respective brake cylinders is kept optimum.

According to the braking pressure control apparatus disclosed in the above-identified application, the pressurizing device is controlled according to the operating state of the brake operating member, irrespective of the operating states of the individual pressure control valve devices. However, it was found that the pressure of the pressurized fluid delivered from the pressuring device is influenced by the flows of the fluid through each pressure control valve device.

SUMMARY OF THE INVENTION

It is therefore an object of the present invention to provide a braking pressure control apparatus wherein the pressure of the pressurized fluid delivered from the pressurizing device is less likely to be influenced by the fluid flows through the pressure control valve devices.

The above object may be achieved according to any one of the following modes or forms of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking pressure control apparatus for a braking system having a plurality of brake cylinders, comprising:

a pressurizing device capable of pressurizing a working fluid and controlling a pressure of the pressurized fluid;

a plurality of pressure control valve devices each of which is disposed between the pressurizing device and at least one of the plurality of brake cylinders and is operable to control flows of the fluid between the pressurizing device and the corresponding at least one brake cylinder, for thereby regulating the fluid pressure in the corresponding at least one brake cylinder; and a pressurizing-device control device operable to control the pressurizing device for controlling an output pressure of the pressurizing device, on the basis of an operating state of each pressure control valve device, which operating state determines a state of flow of the fluid between said pressurizing device and the corresponding at least one brake cylinder.

In the braking pressure control apparatus constructed according to the above mode (1) of this invention, the pressurizing-device control device is adapted to control the pressurizing device for controlling the output pressure of the pressurizing device, on the basis of the state of flow of the fluid through each of the pressure control valve devices between the pressurizing device and the corresponding at least one brake cylinder, so that the undesirable influence of the fluid flow between the pressurizing device and the wheel brake cylinder or cylinders on the output pressure of the pressurizing device can be reduced.

Where each pressure control valve device has a fluid-supply state for supplying the pressurized fluid from the pressurizing device to the corresponding brake cylinder or cylinders, and a closed state for inhibiting the supply of the pressurizing fluid from the pressurizing device to the brake cylinder or cylinders, for instance, the pressurizing-device control device may be arranged to control the pressuring device in different manners in the open and closed states of the pressure control valve device, respectively, or in one of different manners which is selected according to a switching operation of the pressure control valve device between the fluid-supply and closed states.

Where each pressure control valve device has a fluid-discharge state for discharging the pressurized fluid from the brake cylinder or cylinders back to the pressurizing device, and a closed state for inhibiting the discharge flow of the pressurized fluid from the brake cylinder or cylinders to the pressurizing device, for instance, the pressurizing-device control device may be arranged to control the pressurizing device in different manners in the fluid-discharge state and the closed state, respectively, or in one of different manners which is selected according to a switching operation of the pressure control valve device between the fluid-discharge and closed states.

Where each pressure control valve device is capable of changing the amounts of the fluid that are supplied to and discharged from each brake cylinder, the pressurizing-device control device may control the pressurizing device in different manners depending upon the amounts of supply and discharge of the fluid to and from each brake cylinder.

The fluid flow through each pressure control valve device has a particularly large influence on the output pressure of the pressurizing device when the pressurizing device is placed in a constant or substantially constant operating state. When the operating state of the pressurizing device is held constant, the output pressure of the pressurizing device is usually held substantially constant. If the pressure control valve device is switched from the closed state to the fluid-supply state while the output pressure of the pressurizing device is held substantially constant, the output pressure is reduced. By controlling the pressurizing device so as to increase its output pressure upon switching of the pressure control valve device from the closed state to the fluid-supply state, therefore, the reduction of the output pressure due to the switching of the pressure control valve device to the fluid-supply state can be reduced. By controlling the pressurizing device so as to reduce its output pressure upon switching of the pressure control valve device from the closed state to the fluid-discharge state, the increase of the output pressure due to the switching of the pressure control valve device to the fluid-discharge state can be reduced.

Each pressure control valve device serves to regulate the fluid pressure in only one brake cylinder, or the fluid pressure in two or more brake cylinders. The pressure control valve devices indicated above need not be provided for all of the brake cylinders.

(2) A braking pressure control apparatus according to the above mode (1), wherein the pressurizing-device control device includes a valve-device-state detecting portion operable to detect the operating state of each pressure control valve device, said pressurizing-device control device controlling the pressurizing device on the basis of the operating state detected by the valve-device-state detecting portion.

The state of fluid flow between the pressurizing device and the at least one brake cylinder is determined by the operating state of the corresponding pressure control valve device. Accordingly, the pressurizing-device control device controls the pressurizing device on the basis of the detected operating state of the pressure control valve device, in order to reduce the influence of the fluid flows on the output pressure of the pressurizing device.

Where each pressure control valve device includes a plurality of control valves, for instance, the valve-device-state detecting portion may directly detect the operating state of each of the control valves, or indirectly detect the operating state on the basis of a control command generated by a valve control device which is principally constituted by a computer and operable to control the control valves. For example, each pressure control valve device has a fluid-supply state in which the pressurized fluid is supplied from the pressurizing device to the at least one brake cylinder, and a fluid-discharge state in which the pressurized fluid delivered from the pressurizing device is not supplied to the at least one brake cylinder while the pressurized fluid is discharged from the at least one brake cylinder. The fluid-supply state is selected when the fluid pressure in the at least one brake cylinder should be increased, and the fluid-discharge state is selected when the fluid pressure in the at least one brake cylinder should be reduced. Thus, the operating state of the pressure control valve device is switched to the fluid-supply state or fluid-discharge state, depending upon whether the fluid pressure in the corresponding brake cylinder or cylinders should be increased or reduced. The presently selected operating state of the pressure control valve device is represented by the control command generated by the valve control device, and can therefore be detected on the basis of the control command. The pressurized fluid discharged from the brake cylinder in the fluid-discharge state may or may not be returned to the pressurizing device.

The valve-device-state detecting portion may be arranged to detect the operating states of all of the pressure control valve devices, or the operating states of the selected one or ones of the pressure control valve devices. Where the pressurizing device is controlled on the basis of the operating states all of the pressure control valve devices, the valve-device-state detecting portion is desirably arranged to detect the operating states of all the pressure control valve devices. Where the pressurizing device is controlled on the basis of the operating state or states of the selected pressure control valve device or devices, the valve-device-state detecting portion may be arranged to detect the operating state of only the selected at least one pressure control valve device. Where the brake cylinders are wheel brake cylinders for braking respective wheels of an automotive vehicle, the pressurizing device may be controlled on the basis of the operating states of the pressure control valve devices for the wheel brake cylinders for the front wheels, and not on the basis of the operating states of the pressure control valve devices for the wheel brake cylinders for the rear wheels. In this case, the valve-device-state detecting portion need not detect the operating states of the pressure control valve devices for the rear wheel brake cylinders. In this respect, it is noted that the front wheel brake cylinders usually have a larger braking capacity than the rear wheel brake cylinders, and the fluid flows to and from the front wheel brake cylinders have a larger influence on the output pressure of the pressurizing device. In this sense, it is reasonable to control the pressurizing device on the basis of the operating states of the pressure control valve devices for the front wheel brake cylinders.

(3) A braking pressure control apparatus according to the above mode (1) or (2), further comprising a valve-device control portion operable to control each of the pressure control valve devices on the basis of a running condition of an automotive vehicle on which the braking system is provided.

The valve-device control portion may include at least one of (a) an anti-lock pressure control portion for controlling the fluid pressure of the brake cylinder for braking a slipping wheel of the vehicle such that the slipping amount of the slipping wheel is held within an optimum range; (b) a front-rear braking-force distribution control portion for controlling the fluid pressures of the brake cylinders for braking the front and rear wheels of the vehicle such that a ratio of the total front braking force generated by the front wheel brake cylinders to the total rear braking force generated by the rear wheel brake cylinders coincides with an optimum value determined by an ideal distribution curve; (c) a braking effect control portion for controlling the fluid pressures of the wheel brake cylinders, so as to provide a total vehicle braking force as desired by the operator of the vehicle; (d)) a left-right braking-force distribution control portion for controlling the fluid pressures of the brake cylinders for braking the left and right wheels of the vehicle during turning of the vehicle, such that the total left braking force generated by the left wheel brake cylinders and the total right braking force generated by the right wheel brake cylinders are controlled so as to permit the vehicle to run with high stability; (e) a traction control portion for activating the brake cylinders for the drive wheels of the vehicle such that the slipping amounts of the slipping drive wheels are held within an optimum range; (f) a vehicle running stability control portion for controlling the wheel brake cylinders of the vehicle so as to assure stable running of the vehicle; (g) a vehicle turning stability control portion for controlling the wheel brake cylinders of the vehicle so as to assure stable turning of the vehicle; and (h) an automatic braking control portion for controlling the wheel brake cylinders of the vehicle so as to apply an automatic brake to the vehicle as needed.

(4) A braking pressure control apparatus according to any one of the above modes (1)–(3), further comprising a valve-device control portion operable for controlling each pressure control valve device such that pressure of the fluid in the corresponding at least one brake cylinder is controlled to be lower than the output pressure of the pressurizing device.

Generally, the presently established operating state of a pressure control valve device does not assure a particular fluid flow through the pressure control valve device while the pressure control valve device is held in that operating state. Where the pressure control valve device is placed in the fluid-supply state for supplying the pressurizing fluid from the pressurizing device to the brake cylinder or cylinders, the pressurized fluid is supplied to the brake cylinder or cylinders while the output pressure of the pressurizing device is higher than the fluid pressure in the brake cylinder or cylinders. After the brake cylinder pressure has been increased to the level equal to the output pressure of the pressurizing device, the pressurized fluid is no longer supplied to the brake cylinder or cylinders. The pressure control valve device may be placed in the fluid-supply device when a brake operating member is in operation, for example. In this case, the pressurized fluid may not be supplied to the brake cylinder or cylinders even while the brake operating member is kept operated. In the braking pressure control apparatus constructed according to the above mode (4), however, the valve-device control portion does not hold the pressure control valve device in the fluid-supply state until the fluid pressure in the corresponding at least one brake cylinder has been increased to the level of the output pressure of the pressurizing device, so that the pressurized fluid delivered from the pressurizing device is supplied to the corresponding at least one brake cylinder as long as the pressure control valve device is held in the fluid-supply state.

Where the pressure control valve device includes a solenoid-operated shut-off valve disposed between the pressurizing device and the corresponding at least one brake cylinder, the pressurized fluid is supplied or is not supplied to the brake cylinder or cylinders while the shut-off valve is in the open state, and is inhibited from being supplied to the brake cylinder or cylinders while the shut-off valve is in the closed state. Where the solenoid-operated shut-off valve is alternately opened and closed with a controlled duty ratio or cycle by the valve-device control portion in the apparatus according to the above mode (4), however, it is considered that the pressurized fluid is supplied to the brake cylinder or cylinders throughout the duty-ratio-controlled operation of the shut-off valve, since the brake cylinder pressure is controlled to be lower than the output pressure of the pressurizing device.

(5) A braking pressure control apparatus according to any one of the above modes (1)–(4), wherein the pressurizing-device control device includes a pressure sensor for detecting the output pressure of the pressurizing device, at a position between the pressurizing device and the corresponding at least one pressure control valve device, said pressurizing-device control device controlling the pressurizing device on the basis of the output pressure as detected by the pressure sensor.

In the braking pressure control apparatus according to the above mode (5), a change of the output pressure of the pressurizing device due to the fluid flows between the pressurizing device and the brake cylinder or cylinders through each pressure control valve device is detected directly by the pressure sensor, and the pressurizing device is controlled by the pressurizing-device control device on the basis of the detected output pressure of the pressurizing device, so as to reduce the influence of the fluid flows through the pressure control valve device.

For the pressure sensor to be able to detect with high efficiency and accuracy a change of the output pressure of the pressurizing device due to the switching operation of the pressure control valve devices, the pressure sensor is preferably disposed at a position as close as possible to the pressure control valve devices, namely, in a fluid passage connecting the pressurizing device and the pressure control valve devices, desirably in a portion of the fluid passage near the pressure control valve devices. However, the pressurizing device may incorporate the pressure sensor. Alternatively, each pressure control valve device may incorporate the pressure sensor.

(6) A braking pressure control apparatus according to the above mode (5), wherein said pressurizing device includes (a) a pump device operable to pressurize the working fluid, and (b) a master cylinder including a cylinder housing, and a pressurizing piston which is fluid-tightly and slidably fitted in the cylinder housing and which cooperates with the cylinder housing to define a rear pressurizing chamber) connected to the pump device and a front pressurizing chamber connected to the corresponding at least one brake cylinder, the pressurizing piston being advanced by an increase in the pressure of the pressurized fluid which is supplied from the pump device into the rear pressurizing chamber, so that the pressure in the front pressurizing chamber is increased, and wherein the pressure sensor includes at least one of a sensor for detecting the pressure of the fluid in the front pressurizing chamber, and a sensor for detecting the pressure of the fluid in the rear pressurizing chamber.

(7) A braking pressure control apparatus according to any one of the above modes (1)–(6), wherein the pressurizing-device control device includes a pressure increase control portion operable to increase the output pressure of the pressurizing device when an amount of the fluid to be supplied into the at least one brake cylinder corresponding to each of the pressure control valve devices tends to be increased by each pressure control valve device, and a pressure reduction control portion operable to reduce the output pressure of the pressurizing device when an amount of the fluid to be discharged from the at least one brake cylinder corresponding to each pressure control valve device tends to be increased by each pressure control valve device.

In the braking pressure control apparatus according to the above mode (7), the output pressure of the pressurizing device is increased when each pressure control valve device is placed in a state for increasing the amount of the fluid to be supplied into the corresponding at least one brake cylinder. Accordingly, an undesirable reduction of the output pressure due to the fluid supply from the pressurizing device into the corresponding at least one brake cylinder can be reduced. Each pressure control valve device may include a simple solenoid-operated shut-off valve disposed between the pressurizing device and the corresponding at least one brake cylinder, or a flow control valve whose opening is variable with a change in an amount of electric current to be applied thereto, to control a rate of flow of the fluid between the pressurizing device and the corresponding at least one brake cylinder. Where the pressure control valve device includes the solenoid-operated shut-off valve, the amount of the fluid to be supplied to the corresponding at least one brake cylinder can be increased by holding the shut-off valve in the open state, or by alternately placing the shut-off valve in the open and closed state with a controlled duty ratio or cycle, as described above with respect to the above mode (4).

When the pressure control valve device is placed in a state for increasing the amount of the fluid to be discharged from the brake cylinder, the output pressure of the pressurizing device is reduced, so that an undesirable increase of the output pressure due to the discharge from the brake cylinder toward the pressuring device can be reduced.

(8) A braking pressure control apparatus according to any one of the above modes (1)–(7), wherein the pressurizing-device control device includes a first control portion operable to control the output pressure of the pressurizing device on the basis of a condition of an automotive vehicle on which the braking system is provided, and a second control portion operable to control the output pressure on the basis of the operating state of the pressure control valve device.

In the braking pressure control apparatus according to the above mode (8), the first control portion controls the output pressure of the pressurizing device on the basis of the condition of the vehicle. When a brake operating member for activating the braking system is in operation, for example, the output pressure is controlled by the first control portion on the basis of the amount of operation of the brake operating member. When the brake operating member is not in operation, the output pressure is controlled on the basis of the running condition of the vehicle, such as the slipping state of a slipping drive wheel or wheels, a condition of turning of the vehicle, a running speed of the vehicle, and an acceleration value of the vehicle wheels. The control of the output pressure of the pressurizing device on the basis of the vehicle running condition includes not only a control in which the output pressure is controlled to a value corresponding to the vehicle running condition, but also a control in which the output pressure is controlled to a predetermined value, as in the traction control, vehicle running stability control, and vehicle turning stability control. The predetermined value indicated above may be the same in all of the different controls indicated above, or may be different in the respective different controls. Alternatively, the value to which the output pressure is controlled may be determined on the basis oaf the vehicle running condition at the time the traction control or other appropriate control is initiated. The control of the output pressure on the basis of the vehicle running condition also includes an automatic braking control in which the output pressure is controlled to a value corresponding to the vehicle running condition that requires an automatic brake application to the vehicle. For example, the automatic braking control is effected when a distance between the vehicle in question and an object in front of the vehicle (a vehicle running in front of the vehicle) becomes smaller than a predetermined threshold. In this case, the output pressure is controlled to a value which is determined by the distance between the vehicle and the object, a rate of change of the distance, or a derivative of the rate of change.

On the other hand, the second control portion controls the output pressure of the pressurizing device on the basis of the operating state of each pressure control valve device. For instance, the second control portion controls the output pressure such that the output pressure is higher when the pressure control valve device is placed in a fluid-supply state for supplying the pressurizing fluid from the pressurizing device into the brake cylinder, than when the pressure control valve device is placed in a closed state for inhibiting the fluid supply into the brake cylinder. Alternatively, the second control portion controls the output pressure such that the output pressure is higher within a predetermined period of time after the pressure control valve device is switched from the closed state to the fluid-supply state, than after the predetermined period of time has expired. Similarly, the second control portion controls the output pressure such that the output pressure is lower when the pressure control valve device is placed in a fluid-discharge state for discharging the fluid from the brake cylinder to the pressurizing device, than when the pressure control valve device is placed in a closed state for inhibiting the fluid discharge from the brake cylinder to the pressurizing device. Alternatively, the second control portion controls the output pressure such that the output pressure is lower within a predetermined period of time after the pressure control valve device is switched from the closed state to the fluid-discharge state, than after the predetermined period of time has expired.

The output pressure of the pressurizing device may be controlled to a value different from the value determined by the first control portion, for instance, to a value which is larger or smaller by a suitable adjusting amount, than the value determined by the first control portion. The adjusting amount may be a predetermined value, or a value which changes with the running condition of the vehicle or a difference between the present output pressure of the pressurizing device and the fluid pressure in the brake cylinder. Where the pressure control valve device is controlled on the basis of the vehicle running condition, the operating state of the pressure control valve device or the state of fluid flow through the pressure control valve device can be determined on the basis of the vehicle running condition. In this respect, it is reasonable to determine the adjusting amount of the basis of the vehicle running condition.

The second control portion controls the output pressure of the pressurizing device to a value different from that determined by the first control portion, for instance, to one of a minimum value, a maximum value and an intermediate value which is selected depending upon the operating state of the pressure control valve device. Those minimum, maximum and intermediate values are determined by the capacity of the pressurizing device. Alternatively, the output pressure is controlled according to a predetermined pattern, or on the basis of the vehicle running condition or the difference between the output pressure of the pressuring device and the pressure of the brake cylinder.

The second control portion may be considered to be a portion for adjusting or changing the output pressure of the pressurizing device which has been determined by the first control portion.

(9) A braking pressure control apparatus according to any one of the above modes (1)–(8), wherein the pressurizing device includes a pressurizing portion for pressurizing the working fluid, and a pressure-reducing control valve capable of controlling the output pressure of the pressurizing device by reducing the pressure of the fluid pressurized by the pressurizing portion, and wherein the pressurizing-device control device includes a pressure-reducing-valve control portion operable to control the pressure-reducing control valve on the basis of the state of flow of the fluid between the pressurizing device and the corresponding at least one brake cylinder.

The influence of the fluid flow to and from the brake cylinder on the output pressure of the pressurizing device can be reduced by controlling the pressure-reducing control valve on the basis of the state of flow of the fluid between the pressurizing device and the brake cylinder.

The pressure-reducing control valve of the pressurizing device may be a solenoid-operated shut-off valve which is alternately opened and closed with a controlled duty ratio or cycle, or a linear pressure-reducing control valve the opening of which is controllable by controlling the electric current applied thereto.

(10) A braking pressure control apparatus according to the above mode (9), wherein the pressure-reducing control valve is a solenoid-operated linear control valve capable of controlling the pressure of the fluid pressurized by the pressurizing portion to a value corresponding to an amount of electric current applied thereto, and wherein the pressure-reducing-valve control portion includes an electric current control portion for controlling the electric current to be applied to the solenoid-operated linear control valve.

In the apparatus according to the above mode (9), the output pressure of the pressurizing device can be efficiently controlled by controlling the amount of electric current to be applied to the linear control valve, which will be described in detail in the DETAILED DESCRIPTION OF THE PREFERRED EMBODIMENTS.

(11) A braking pressure control apparatus according to any one of the above modes (1)–(10), wherein the pressurizing device comprises a pump device including a pump for pressuring the working fluid, and a pump drive source for driving the pump, and the pressurizing-device control device includes a pressurizing-capacity control portion operable to control a pressurizing capacity of the pump device on the basis of the operating state of each pressure control valve device which determines the state of flow of the fluid between the pressurizing device and the corresponding at least one brake cylinder.

The undesirable reduction and increase of the output pressure of the pressurizing device due to the fluid flow to and from the wheel brake cylinder can be reduced by increasing and reducing the pressurizing capacity of the pump device, respectively.

(12) A braking pressure control apparatus according to the above mode (11), wherein the pump drive source is an electric motor, and the pressurizing-capacity control portion includes a speed control portion operable for controlling an operating speed of the electric motor.

The operating speed of the electric motor can be controlled by controlling an amount of electric energy supplied to the electric motor, so that the pressurizing capacity of the pump device can be controlled.

The delivery pressure and rate of the fluid pressurized by the pressurizing device are determined by the fluid pressure in the brake cylinder to which the pressurized fluid is supplied, so that the delivery pressure and rate are not necessarily increased by increasing the operating speed of the electric motor. However, the pressurizing capacity of the pump device can be increased by controlling the amount of electric energy to be supplied to the electric motor, so as to increase the operating speed of the electric motor.

(13) A braking pressure control apparatus according to any one of the above modes (1)–(12), wherein the pressurizing-device control device controls the pressurizing device according to a highest one of desired values of the fluid pressures in the plurality of brake cylinders.

By controlling the pressurizing device according to a highest one of the desired fluid pressures in the plurality of brake cylinders, it is possible to avoid insufficiency of the fluid pressure in each of the plurality of brake cylinders which are activated for a given purpose, and also possible to prevent the fluid pressures in the brake cylinders from rising to an excessively high level as compared with the desired values when the pressurized fluid is supplied from the pressurizing device to the brake cylinders. The pressurizing device according to the above mode (13 makes it possible to reduce the required frequency of operations of the pressure control valve device to control the fluid pressure in the corresponding at least one brake cylinder.

Where each of the plurality of brake cylinders is controlled such that the actual fluid pressure coincides with the desired braking pressure determined for that brake cylinder, the output pressure of the pressurizing device is controlled according to a highest one of the desired braking pressures of the brake cylinders, more specifically, such that the output pressure is controlled to be equal to the highest desired braking pressure or equal to a value corresponding to the highest desired braking pressure. The actual fluid pressures in the brake cylinders are controlled to be equal to the determined desired braking pressures, in the front-rear braking-force distribution control, left-right braking-force distribution control, braking effect control, automatic braking control, vehicle turning stability control and vehicle running stability control, which will be described in detail in the DESCRIPTION OF THE PREFERRED EMBODIMENTS.

Where the fluid pressure in the brake cylinder for a slipping drive wheel is controlled for the traction control of an automotive vehicle so that the slipping amount of the slipping wheel is held within an optimum range, one of the wheel brake cylinders whose fluid pressure tends to be insufficient is determined on the basis of the operating states of the pressure control valve devices corresponding to the brake cylinders, and the output pressure of the pressurizing device is controlled so that the slipping amount of the wheel corresponding to the wheel brake cylinder whose fluid pressure tends to be insufficient is held within the optimum range, as described in derail in the DESCRIPTION OF THE PREFERRED EMBODIMENTS. By controlling the output pressure of the pressurizing device in the manner described above, the output pressure is eventually controlled according to the highest one of the desired braking pressures of the plurality of wheel brake cylinders.

Where the pressurizing device includes at least one of the pressure-reducing control valve and the pump device which have been described, the output pressure of the pressurizing device may be controlled by controlling the pressure-reducing control valve or the pump device.

(14) A braking pressure control apparatus according to any one of the above modes (1)–(13), further comprising a valve-device control portion operable to control each of the pressure control valve devices for regulating the fluid pressure in said corresponding at least one brake cylinder, and wherein the pressurizing-device control device includes a constant-pressure control portion operable to control the pressurizing device such that the output pressure is held at a predetermined constant value.

In the apparatus according to the above mode (14), the pressurizing device is controlled such that the output pressure is held at a predetermined constant value, and the fluid pressure in each brake cylinder is controlled by the corresponding brake control valve device. The predetermined constant value may be the same in all of the different controls (such as the traction control), may be different in the respective different controls, or may be determined on the basis of the vehicle running condition at the time the traction control or other appropriate control is initiated.

(15) A braking pressure control apparatus for a braking system having a plurality of brake cylinders, said braking pressure control apparatus comprising:

a pressurizing device capable of pressurizing a working fluid and controlling a pressure of the pressurized fluid:

a plurality of pressure control valve device each of which is disposed between the pressurizing device and at least one of the plurality brake cylinders and is operable to control flows of the fluid between the pressurizing device and the corresponding at least one brake cylinder, for thereby regulating the fluid pressure in the corresponding at least one brake cylinder; and a pressurizing-device control device for controlling the pressurizing device to control an output pressure of the pressurizing device, the pressurizing-device control device including a forecasting type control portion operable to initiate an operation of controlling the output pressure of the pressurizing device upon detection of a symptom indicating that the pressure control valve device will be operated within a predetermined time to initiate a flow of the fluid between the pressurizing device and the corresponding at least one brake cylinder.

In the braking pressure control apparatus constructed according to the above mode (15) of this invention, the control of the output pressure of the pressurizing device is initiated upon detection of a symptom indicating that the pressure control valve device will be operated within a predetermined time, namely, in the near future, to initiate a flow of the fluid between the pressurizing device and the corresponding at least one brake cylinder. Accordingly, an undesirable influence of the fluid flow to and from the brake cylinder or cylinders on the output pressure of the pressurizing device can be efficiently reduced.

In the present apparatus, the forecasting type control portion of the pressurizing-device control device is adapted to initiate the control of the output pressure of the pressurizing device when an operation of each pressure control valve device to initiate a fluid flow between the pressurizing device and the at least one brake cylinder is expected to take place in the near future, that is, upon detection of a symptom indicating that such a fluid flow will highly probably take place in a short time. Even if this symptom is detected (and the operation to control the pressurizing device is initiated by the forecasting type control portion), the fluid flow may not in fact take place. In this case, however, there does not arise a problem since the operation to control the pressurizing device does not cause a considerable amount of change of the output pressure of the pressurizing device.

The braking pressure control apparatus according to the above mode (15) may include a technical feature according to any one of the above modes (1)–(14).

(16) said forecasting type control portion includes a running-condition forecasting portion operable on the basis of a running condition of an automotive vehicle on which the braking system is provided, to forecast whether a switching operation of each pressure control valve device will take place to initiate the flow of the fluid between the pressurizing device and the corresponding at least one brake cylinder.

Where each pressure control valve device is controlled by a valve-device control device depending upon the running condition of the vehicle, a symptom indicating that a fluid flow will take place between the pressurizing device and the corresponding at least one brake cylinder can be detected on the basis of the running condition of the vehicle.

For instance, the pressurized fluid is supplied to the at least one brake cylinder through the pressure control valve device when the stability of the running condition of the vehicle is reduced below a predetermined lower limit. In this case, it is determined that there exists the symptom indicating that the fluid flow will take place in the near future, if the stability of the vehicle running condition is reduced below a predetermined threshold higher than the above-indicated lower limit and if the stability is being deteriorated.

(17) A braking pressure control apparatus according to any one of the above modes (1)–(16), wherein the pressurizing device includes:

a pump device operable to pressurize the working fluid; and a master cylinder including a cylinder housing, and a pressurizing piston which is fluid-tightly and slidably fitted in the cylinder housing and which cooperates with the cylinder housing to define a rear pressurizing chamber connected to the pump device and a front pressurizing chamber connected to the corresponding at least one brake cylinder, the pressurizing piston being advanced by an increase in the pressure of the pressurized fluid which is supplied from the pump device into the rear pressurizing chamber, so that the pressure in the front pressurizing chamber is increased.

The braking pressure control apparatus according to the above mode (17) uses one preferred form of the pressurizing device. This apparatus will be described in detail in the DETAILED DESCRIPTION OF THE PREFERRED EMBODIMENTS.

(18) A braking pressure control apparatus for a braking system having a plurality of brake cylinders, the braking pressure control apparatus comprising:

a pressurizing device including a pump device operable to pressurize a working fluid, and a master cylinder having a cylinder housing, and a pressurizing piston which is fluid-tightly and slidably fitted in the cylinder housing and which cooperates with the cylinder housing to define a rear pressurizing chamber connected to the pump device and a front pressurizing chamber connected to the corresponding at least one brake cylinder, the pressurizing piston being advanced by an increase in the pressure of the pressurized fluid which is supplied from the pump device into the rear pressurizing chamber, so that the pressure in the front pressurizing chamber is increased;

a plurality of pressure control valve devices each of which is disposed between the pressurizing device and at least one of the plurality of brake cylinders and is operable to control flows of said fluid between the pressurizing deice and the corresponding at least one brake cylinder, for thereby regulating the fluid pressure in the corresponding at least one brake cylinder, for thereby regulating the fluid pressure in the corresponding at least one brake cylinder; and a control device operable to control at least one of the pressurizing device and each pressure control valve device, for thereby regulating the fluid pressure in the corresponding at least one brake cylinder.

The control device provided in the braking pressure control apparatus according to the above mode (18) is operable in one of the following three modes:

1) The control device controls each pressure control valve device while the output pressure of the pressurizing is held at a predetermined substantially constant value.

In the above mode of operation, the predetermined value of the output pressure of the pressurizing device is preferably determined so as to avoid insufficiency of the fluid pressure in all of the at least one brake cylinder corresponding to each pressure control valve device. Each pressure control valve device may include a solenoid-operated shut-off valve which is opened and closed as needed or a solenoid-operated control valve capable of controlling the fluid pressure in the corresponding at least one brake cylinder according to an amount of electric current to be applied to that valve. The solenoid-operated shut-off valve may be alternately opened and closed with a controlled duty ratio or cycle.

The pressurizing device may be controlled to be held in a substantially constant operating state. In this case, the output pressure of the pressurizing device may be more or less varied due to fluid flows between the pressurizing device and the at least one brake cylinder through the pressure control valve device, but can be held at a substantially constant value.

2) The control device controls the output pressure of the pressurizing device according to a highest one of desired values of the fluid pressures in the brake cylinders, and controls the pressure control valve device corresponding to the brake cylinder whose desired fluid pressure value is the highest, such that this brake cylinder is held in communication with the pressurizing device through the corresponding pressure control valve device, while controlling the other pressure control valve device or devices so as to regulate the fluid pressure or pressures in the corresponding brake cylinder or cylinders.

Where the output pressure of the pressurizing device is controlled to be equal to the highest one of the desired fluid pressures of the brake cylinders, the fluid pressure in the brake cylinder whose desired fluid pressure is the highest is made equal to the output pressure of the pressurizing device, by holding that brake cylinder in communication with the pressurizing device. Thus, the fluid pressure of this brake cylinder can be controlled to be equal to the desired value. The fluid pressures in the other brake cylinders are controlled by controlling the corresponding pressure control valve device or devices.

Where the output pressure of the pressurizing device is controlled to be proportional to the highest one of the desired fluid pressure values of the brake cylinders, the fluid pressure in the brake cylinder whose desired fluid pressure is the highest must also be controlled as needed by the corresponding pressure control valve device.

In either of the two cases indicated above, the pressure of the pressurized fluid to be supplied from the pressurizing device to the brake cylinders will not be excessively high or low.

The above-indicated two modes of operation of the control device are suitable where the fluid pressures in the individual brake cylinders are controlled to respective different desired values independently of each other.

3) The control device controls the pressurizing device such that the output pressure of the pressurizing device is equal to the desired pressure of the brake cylinder or cylinders, and controls the pressure control valve devices such that the pressurizing device is held in communication with the brake cylinder or cylinders through the pressure control valve device or devices.

This mode of operation is suitable where the fluid pressures in the two or more brake cylinders are controlled to the same desired value. The desired fluid pressure can be established in all of the brake cylinders by controlling the output pressure of the pressuring device to be equal to the desired fluid pressure of the brake cylinders and holding the brake cylinders in communication with the pressurizing device. This control arrangement eliminates a need of controlling the pressure control valve devices for controlling the corresponding brake cylinders, or reduces the required number of operations of the pressure control valve devices, resulting in reduced operating noise and vibration of the pressure control valve devices.

The braking pressure control apparatus according to the above mode (18) may incorporate any technical feature according to any one of the above modes (1)–(17).

(19) A braking pressure control apparatus according to the above mode (18), wherein the pressurizing device further includes a pressure-reducing control valve capable of controlling the pressure of the fluid pressurized by the pump device, and wherein the control device activates the pump device prior to an operation of each pressure control valve device is initiated to regulate the fluid pressure in the corresponding at least one brake cylinder, the control device controlling the pressure-reducing control valve such that the output pressure of the pressurizing device after activation of the pump device does not exceed a value before activation of the pump device.

Where there is a high probability that an operation of the pressure control device to regulate the fluid pressure in the corresponding at least one brake cylinder will be performed in the near future, that is, within a predetermined relatively short time, a delay in regulating the brake cylinder pressure can be reduced by activating the pump device prior to that operation of the pressure control valve device. Further, the pressure control valve device is controlled so as to prevent the output pressure of the pressurizing device after the activation of the pump device from exceeding the value before the activation of the pump device. This control arrangement makes it possible to avoid an unnecessary increase of the brake cylinder pressure, without having to control the corresponding pressure control valve device.

The braking pressure control apparatus according to the above mode (19) is suitable where the fluid pressures in the brake cylinders are controlled while a brake operating member for activating the braking system is not in operation, in particular, where the traction control, vehicle running stability control, vehicle turning stability control and automatic braking control are effected. In these controls, the fluid pressure in each brake cylinder under control is initially increased in most cases, and an increase of the brake cylinder pressure may be delayed if the pressurized fluid is not rapidly supplied from the pressurizing device to the brake cylinder. This control delay is increased with a decrease in the ambient temperature and with a consequent increase in the viscosity of the working fluid. Where the traction control is initiated on a road surface having a relatively high friction coefficient, the desired rate of increase of the brake cylinder pressure is relatively large (the brake cylinder pressure is required to be increased at a relatively high rate) immediately after the traction control is initiated. In this case, therefore, the control delay due to the low rate of supply of the pressurized fluid to the brake cylinder may be serious. In the present apparatus, however, the pump device is activated prior to the initiation of the traction control, so that the pressurized fluid can be supplied from the pressurizing device to the brake cylinder at a sufficiently high rate, making it possible to minimize the control delay.

(20) A braking control apparatus for a braking system having a plurality of brake cylinders, said braking control apparatus comprising:

a pressurizing device capable of pressurizing a working fluid and controlling a pressure of the pressurized fluid to a desired basic value;

a plurality of pressure control devices which are disposed between the pressurizing device and the plurality of brake cylinders, respectively and each of which is operable to control flows of the fluid between the pressurizing device and a corresponding one of the brake cylinders, for thereby regulating the fluid pressure in the corresponding brake cylinder; and a pressurizing-device control device including at least one of a pressure-increase control portion and a pressure-reduction control portion, the pressure-increase control portion being operable to control the pressurizing device such that an output pressure of the pressurizing device is controlled to a value higher than the desired basic value when at least one of the plurality of pressure control valve devices is operated to supply the pressurized fluid to the corresponding brake cylinder, the pressure-reduction control portion being operable to control the pressurizing device such that the output pressure is controlled to a value lower than the desired basic value when at least one of the plurality of pressure control valve devices is operated to discharge the pressurized fluid from the corresponding brake cylinder.

In the braking pressure control apparatus according to the above mode (20), the pressurizing-device control device may further includes a third control portion than said pressure-increase control portion and/or said pressure-reduction control portion, which are operated depending upon the state of flow of the fluid between the pressurizing device and the pressure control valve device. This third control portion is operable to control the pressuring device such that the output pressure is controlled to be equal to the desired basic value.

The braking pressure control apparatus according to the above mode (20) may incorporate any technical feature according to any one of the above modes (1)–(19).

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Referring the accompanying drawings, several presently preferred embodiments of this invention will be described in detail.

Figure 1:
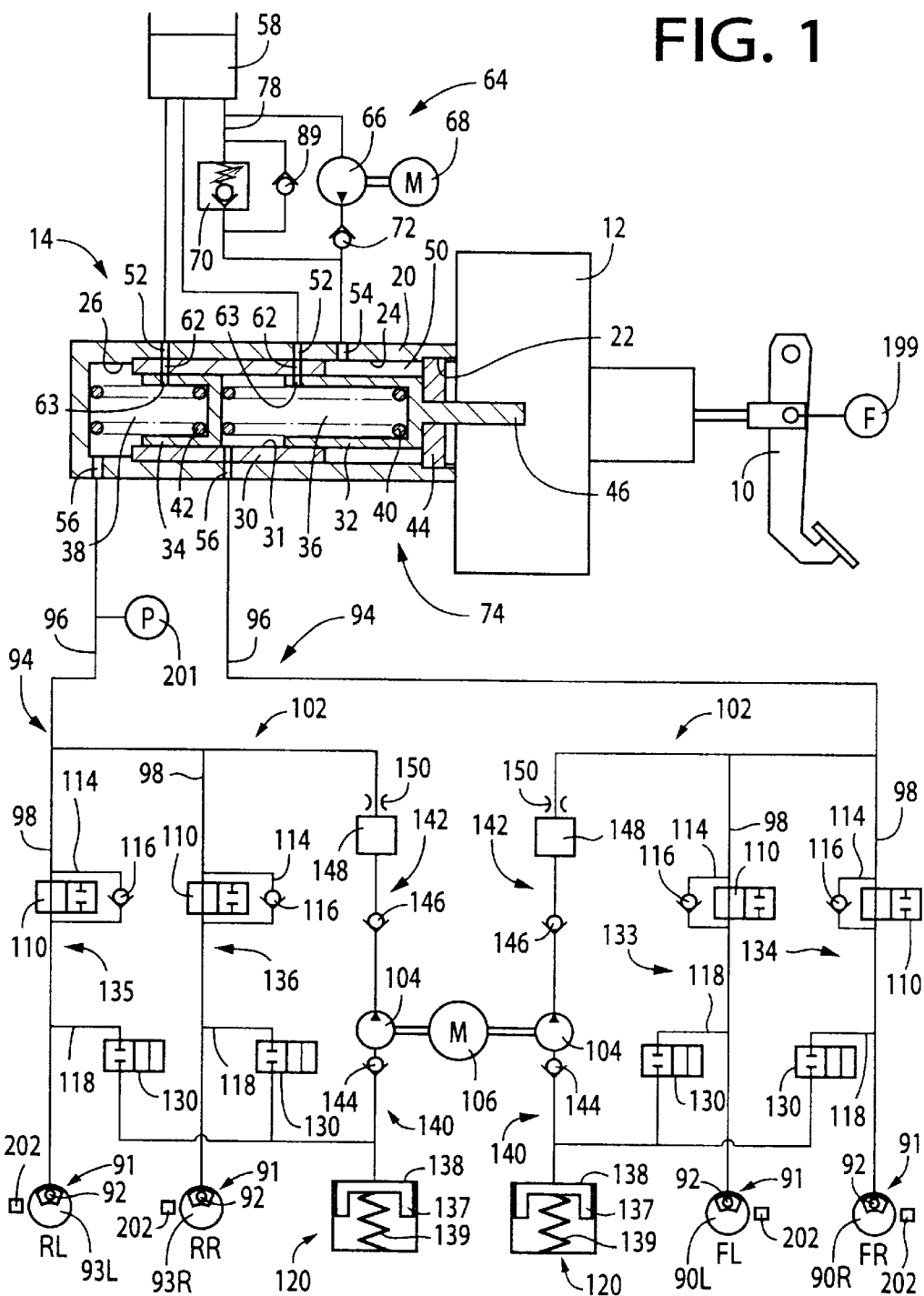
FIG. 1 is a schematic view showing a hydraulically operated braking system including a braking pressure control apparatus constructed according to a first embodiment of this invention.

Reference is first made to FIG. 1 showing a hydraulic operated braking system for an automotive vehicle, which includes a braking pressure control apparatus constructed according to a first embodiment of the present invention. This braking system includes a brake operating member in the form of a brake pedal 10, a vacuum booster 12 (hereinafter referred to simply as "booster 12") operatively connected to the brake pedal 10, and a master cylinder 14 of tandem type operatively connected to the booster 12.

The booster 12 has a negative-pressure chamber, and a variable-pressure chamber which is communicated selectively with the negative-pressure chamber and the atmosphere. The booster 12 includes a power piston which is operated by a force based on a difference between the pressures in the negative-pressure chamber and the variable-pressure chamber, as well known in the art. An operating force acting on the brake pedal 10 is boosted into an output force of the power piston of the booster 12, which is received by the master cylinder 14.

The master cylinder 14 has a cylindrical housing 20 which is closed at one of its opposite axial ends and is open at the other axial end. The housing 20 has a first, a second and third cylindrical bore 22, 24, 26 formed therein such that these cylindrical bores are arranged in the axial direction from the open end towards the closed end. These cylindrical bores 22, 24, 26 have respective different diameters. Namely, the diameter of the bore 22 is larger than that of the bore 24, which is larger than that of the bore 26.

Within the second cylindrical bore 24, there is substantially fluid-tightly received a sleeve 30 which is held at a predetermined position by a suitable retainer member such as a retainer ring, such that one of the opposite axial end faces of the sleeve 30 which is nearer to the closed axial end of the housing 20 is kept in contact with an annular shoulder surface between the second and third cylindrical bores 24, 26. The sleeve 30 has an inner cylindrical surface defining a cylindrical bore 31 in which are fitted a first pressurizing piston 32 and a second pressurizing piston 34 in series with each other. Each of these two pressurizing pistons 32, 34 is a cylindrical member which is closed at one of its axial ends and open at the other end. The pressurizing pistons 32, 34, which are substantially fluid-tightly and slidably fitted in the bore 31, cooperate with the sleeve 30 and the housing 20 to define a first front pressurizing chamber 36 in front of a bottom wall at the closed end of the first pressurizing piston 32, and a second front pressurizing chamber 38 in front of a bottom wall at the closed end of the second pressurizing piston 34. That is, the bottom walls of the pressurizing pistons 32, 34 have inner surfaces which partially define the first and second front pressurizing chambers 36, 38, respectively.

Within the first and second front pressurizing chambers 36, 38, there are disposed respective two elastic members in the form of springs 40, 42, which bias the first and second pressurizing pistons 32, 34 towards their fully retracted positions of FIG. 1. An initial length (or maximum length of elongation) and an initial load of the spring 40 are determined by a suitable member (not shown), and the fully retracted position of the first pressurizing piston 32 is determined by a closure member 44 which will be described. The fully retracted position of the second pressurizing piston 34 is determined by the predetermined initial length and load of the spring 40 and the fully retracted position of the first pressurizing piston 32.

Within the first cylindrical bore 22, there is substantially fluid-tightly received the above-indicated closure member 44, whereby the housing 20 is substantially fluid-tightly closed at its open end. The fully advanced position of the closure member 44 on the side of the closed end of the housing 20 is determined by an abutting contact of the closure member 44 with an annular shoulder surface between the first and second cylindrical bores 22, 24. On the other hand, the fully retracted position of the closure member 44 is determined by a suitable retainer member such as a retainer ring, so that a removal of the closure member 44 from the housing 20 is prevented. As indicated above, the fully retracted position of the first pressurizing piston 32 is determined by its abutting contact of the closure member 44.

The first pressurizing piston 32 has an auxiliary piston 46 extending rearwardly from its rear end face, more precisely, from the rear end face of the bottom wall which partially defines the first front pressurizing chamber 36. The auxiliary piston 46 substantially fluid-tightly and slidably extends through the closure member 44 into the interior of the booster 12. The master cylinder 14 receives the output force of the power piston of the booster 12 through the auxiliary piston 46, so that hydraulic pressures which are substantially equal to each other are generated in the two front pressurizing chambers 36, 38.

The closure member 44 cooperates with the housing 20, the sleeve 30 and the first pressurizing piston 32 to define a rear pressurizing chamber 50 between the closure member 44 and the sleeve 30. A hydraulic pressure generated in this rear pressurizing chamber 50 acts on the first pressurizing piston 32 in the forward direction, causing a hydraulic pressure to be generated in the first front pressuring chamber 36. The hydraulic pressure in the first pressurizing chamber 36 acts on the second pressurizing piston 34 in the forward direction, causing a hydraulic pressure to be generated in the second front pressurizing chamber 38.

The housing 20 has two reservoir ports 52, one pressure-increasing port 54, and two brake cylinder ports 56.

The two reservoir ports 52 are provided for communication of the respective two front pressurizing chambers 36, 38 with a reservoir 58 that is provided to store a working fluid at the atmospheric pressure. The two reservoir ports 52, which are provided corresponding to the respective two pressurizing pistons 32, 34, communicate with the respective front pressurizing chambers 36, 38 through respective two communication passages 62 formed through the sleeve 30 in the radial direction, and respective two communication passages 63 formed through the respective pressurizing pistons 32, 34 held at their fully retracted positions of FIG. 1.

When each pressurizing piston 32, 34 is advanced a small distance from its fully retracted position, the corresponding communication passage 63 is closed by portions of the inner circumferential surface 31 of the sleeve 30 which are located on the front side of the corresponding communication hole 62, so that the communication passage 63 is disconnected from the corresponding reservoir port 52. In this condition, the hydraulic pressure in each front pressurizing chamber 36, 38 can be raised by an advancing movement of the corresponding pressurizing piston 32, 34.

The single pressure-increasing port 54 is formed through an axial portion of the housing 20 which partially defines the rear pressurizing chamber 50, and is provided for communication of the rear pressurizing chamber 50 with a pump device 64. The pump device 64 includes a pressure-increasing pump 66 of gear type, a pump motor 68 for driving the pressure-increasing pump 66, and a pressure control valve 70, which is a linear solenoid valve. The pressure-increasing pump 66 is connected on its suction side to the reservoir 58 and on its delivery side to the pressure-increasing port 54. The working fluid in the reservoir 58 is pumped up and pressurized by the pump 66, and the pressurized fluid is supplied to the rear pressurizing chamber 50. A check valve 72 is provided between the delivery side of the pump 66 and the pressure-increasing port 54, to prevent a flow of the fluid in the direction from the port 54 towards the pump 66. In the present embodiment, the pump device 64, the pressure control valve 70 and the master cylinder 14 cooperate with each other to constitute a major portion of a pressurizing device 74.

Figure 2A:
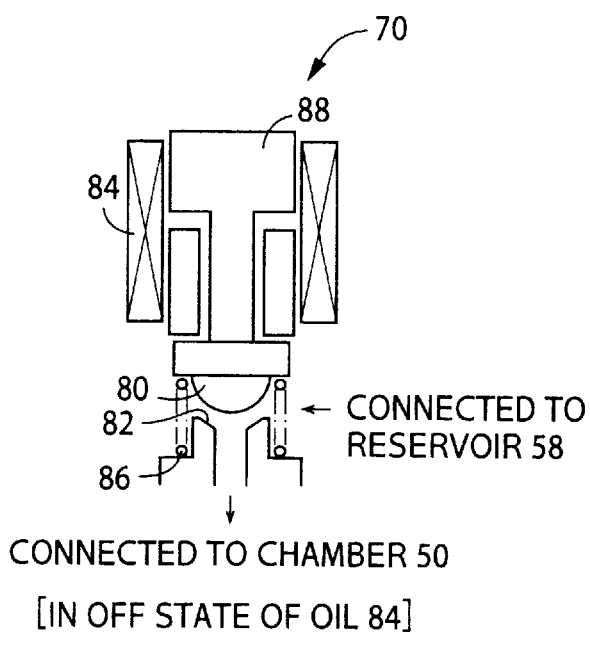
FIGS. 2A and 2B are schematic views showing a pressure control valve included in a pressurizing device of the braking system of FIG. 1.
Figure 2B:
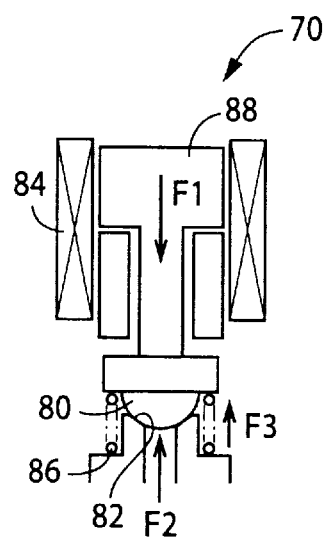

The pressure control valve 70, which is provided to electromagnetically control the hydraulic pressure in the rear pressurizing chamber 50, is disposed in a fluid passage 78 connecting the rear pressurizing chamber 50 and the reservoir 58. As shown in FIGS. 2A and 2B, the pressure control valve 70 includes a housing, a valve member 80, a valve seat 82, and a coil 84 for generating a magnetic force which acts on the valve member 80 in a direction for moving the valve member 80 to be seated on the valve seat 82. With the valve member 80 being seated on and unseated from the valve seat 82, a flow of the fluid through the fluid passage 78 is controlled.

The pressure control valve 70 further includes a spring 86 for biasing the valve member 80 so as to be spaced apart from the valve seat 82. The pressure control valve 70 further includes an armature 88 disposed radially inwardly of a winding of the coil 84. The valve member 80 is movable with the armature 88. When the coil 84 is in a de-energized or off state of FIG. 2A, the valve member 80 is held apart from the valve seat 82, permitting bidirectional flows of the fluid between the rear pressurizing chamber 50 and the reservoir 58. In this off state of the pressure control valve 70, a change in the volume of the rear pressurizing chamber 50 as a result of an advancing movement of the first pressurizing piston 32 upon operation of the brake pedal 10 will cause the fluid to flow between the rear pressurizing chamber 50 and the reservoir 58.

When the coil 84 is in an energized or on state of FIG. 2B, the armature 88 is moved with a magnetic force F1 generated by the energized coil 84, in a direction that causes the valve member 80 to be seated on the valve member 82. At this time, the valve member 80 receives the magnetic force F1 acting thereon in the direction towards the valve seat 82, a force F2 based on a pressure difference across the pressure control valve 70, and an elastic force F3 of the spring 86, as indicated in FIG. 2B. The pressure difference indicated above is a difference between the pressure in the rear pressurizing chamber 50 and the pressure in the reservoir 58. Since the pressure in the reservoir 58 is substantially equal to the atmospheric pressure, the pressure difference is determined by the pressure in the rear pressurizing chamber 50. The magnetic force F1 acts on the valve member 80 in the direction towards the valve seat 82, while a sum of the force F2 and the elastic force F3 acts on the valve member 82 in the reverse direction. The position of the valve member 80 relative to the valve seat 82 and therefore the pressure in the rear pressurizing chamber 50 are determined by the forces F1, F2 and F3.

When the force F2 corresponding to the pressure in the rear pressurizing chamber 50 is equal to or smaller than a difference between the magnetic force F1 and the elastic force F3, that is, when a formula $F2 \leq F1-F3$ is satisfied, the valve member 80 is seated on the valve seat 82, as shown in FIG. 2B, namely, the pressure control valve 70 is closed, so that the pressure control valve 70 pressurized fluid delivered from the pressure-increasing pump 66 flows into the rear pressurizing chamber 50, causing an increase in the pressure in the rear pressurizing chamber 50.

When the force F2 corresponding to the pressure in the rear pressurizing chamber is larger than the difference (F1−F3), that is, when a formula $F2>F1-F3$ is satisfied, the valve member 80 is moved away from the valve seat 82, as shown in FIG. 2A, namely, the pressure control valve 70 is opened, so that the pressurized fluid is discharged from the rear pressurizing chamber 50 into the reservoir 58 through the pressure control valve 70 in the open position, causing a decrease in the pressure in the chamber 50. The magnetic force F1 linearly increases with an increase in the amount of electric current I to be applied to the coil 84. If the elastic force F3 of the spring 86 is ignored, the Hydraulic pressure in the rear pressurizing chamber 50 is linearly increased with an increase in the amount of electric current I.

Referring back to FIG. 1, there is provided a by-pass passage which by-passes both the pressure-increasing pump 66 and the pressure control valve 70 and which is provided with a check valve 89 which permits a flow of the fluid in a direction from the reservoir 58 towards the rear pressurizing chamber 50, but inhibits a flow of the fluid in the reverse direction. This check valve 89 as well as the pressure control valve 70 in the open position permits the fluid to flow from the reservoir 58 towards the rear pressurizing chamber 50, and therefore assures a rapid supply of the fluid into the rear pressurizing chamber 50 when the volume of the chamber 50 is rapidly increased as a result of a rapid operation of the brake pedal 10, whereby the provision of the check valve 89 prevents a negative pressure to be developed in the rear pressurizing chamber 50 upon the rapid operation of the brake pedal 10 for abrupt application of a brake to the vehicle. It is noted, however, that the above-indicated by-pass passage and check valve 89 are not essential, since the pressure control valve 70 is normally held in the open position.

The two brake cylinder ports 56 are formed through respective axial portions of the housing 20 which partially define the respective first and second front pressurizing chambers 36, 38. The two brake cylinder ports 56 are provided for communication of the pressurizing chambers 36, 38 with respective two mutually independent brake application sub-systems which correspond to respective front and rear wheel pairs FL, FR, and RL, RR. One of the two brake application sub-systems includes a pair of front wheel brakes 91 for the front left and right wheels 90L, 90R, while the other brake application sub-system includes a pair of rear wheel brakes 91 for the rear left and right wheels 93L, 93R. The front wheel brakes 91 include respective front wheel brake cylinders 92, while the rear wheel brakes 91 include respective rear wheel brake cylinders 92. Since the two brake application sub-systems are identical in construction with each other, only the front brake application sub-system for the front wheels 90L, 90R will be described. The description of this front broke application sub-system applies to the rear brake application sub-system for the rear wheels RL, RR.

The first front pressuring chamber 36 of the master cylinder 14 is connected to the front wheel brake cylinders 92 for the front left and right wheels 90L, 90R, through a main fluid passage 94. The main fluid passage 94 consists of a common passage 96 extending from the first front pressurizing chamber 36, and two branch passages 98, 98 each of which is connected at one end thereof to the common fluid passage 96 and at the other end to respective two front wheel brake cylinders 92. A pump passage 102 is connected at one end thereof to the main fluid passage 94, and at the other end to a reservoir 120 (which will be described). To the pump passage 102, there is connected an anti-lock pressure control pump 104, which is driven by a pump motor 106. The pump motor 106 is also used to drive an anti-lock pressure control pump 104 provided in the rear brake application sub-system.

Figures 4, 5:
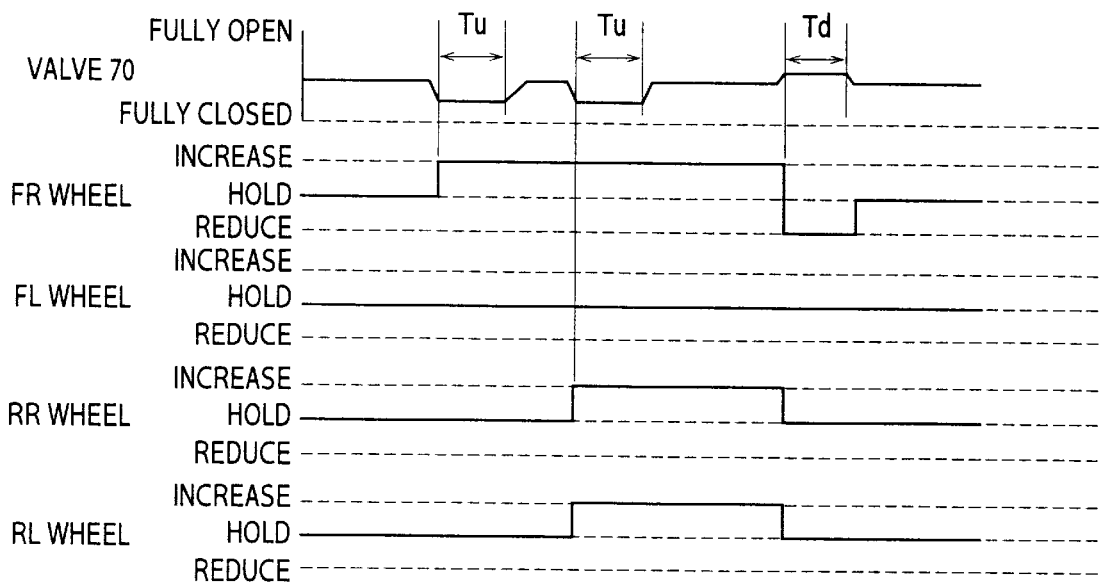
FIG. 4 is a view showing an anti-lock control data map stored in a ROM of the braking pressure control apparatus.
FIG. 5 is a graph indicating operations of various pressure control valve devices controlled by the braking pressure control apparatus.

In a portion of each branch passage 98 between the wheel brake cylinder 92 and a point of connection of the branch passage 98 to the pump passage 102, there is provided a pressure-holding valve 110 in the form of a normally open solenoid-operated shut-off valve having a coil 112 (FIG. 4). When the coil 112 is energized, the pressure-holding valve 110 is closed to prevent a flow of a pressurized fluid delivered from the anti-lock pressure control pump 104 towards the wheel brake cylinder 92, so that the hydraulic pressure in the wheel brake cylinder 92 is held constant at the present value. The pressure-holding valve 110 is provided with a by-pass passage 114 in which is provided a check valve 116 for preventing a fluid flow in a direction from the pump 104 towards the wheel brake cylinder 92.

A reservoir passage 118 is connected at one end thereof to a portion of each branch passage 98 between the pressure-holding valve 110 and the wheel brake cylinder 92, and at the other end to a reservoir 120. The reservoir passage 118 is provided with a normally closed solenoid-operated shut-off valve in the form of a pressure-reducing valve 130 having a coil 132 (FIG. 4). When the coil 132 is energized, the pressure-reducing valve 130 is opened to permit the pressurized fluid to be discharged from the wheel brake cylinder 92 towards the reservoir 120, so that the fluid pressure in the wheel brake cylinder 92 is reduced.

In the present embodiment, the pressure-holding valve 110 and pressure-reducing valve 130 for the front left wheel 90L constitute a front-left-brake pressure control valve device 133, while the pressure-holding valve 110 and pressure-reducing valve 130 for the front right wheel 90R constitute a front-right-brake pressure control valve device 134, and that the pressure-holding valve 110 and press-reducing valve 130 for the rear left wheel 93L constitute a rear-left-brake pressure control valve device 135, while the pressure-holding valve 110 and pressure-reducing valve 130 for the rear right wheel 93R constitute a rear-right-brake pressure control valve device 136.

The reservoir 120 has a housing, a piston 137 which is substantially fluid-tightly and slidably received in the housing and which cooperates with the housing to define a reservoir chamber 138, and biasing means in the form of a spring 139 biasing the piston 137. The reservoir chamber 138 stores the working fluid under pressure in the presence of a biasing action of the spring 139.

The pump passage 102 consists of a suction passage 140 and a delivery passage 142 which are located on the opposite sides of the anti-lock pressure control pump 104. These suction and delivery passages 140, 142 are provided with respective check valves in the form of a suction valve 144 and a discharge valve 146. The delivery passage 142 is provided with a damper chamber 148 and a flow restrictor in the form of an orifice 150, which are connected in series. The damper chamber 148 and the orifice 150 function to reduce a pressure pulsation of the pressurized fluid delivered by the pump 104.

There will next be described an electric control system of the present braking system.

Figure 3:
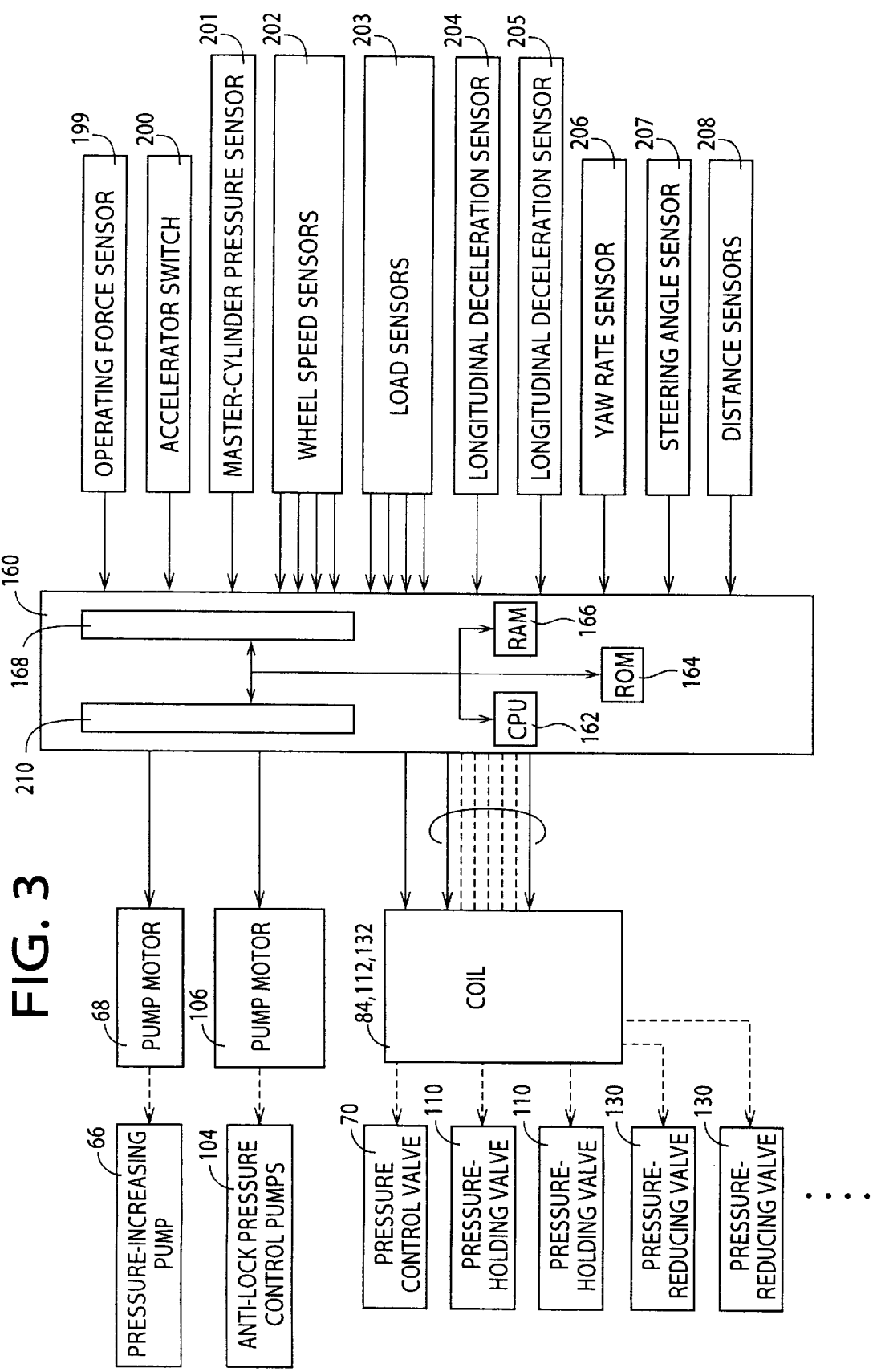
FIG. 3 is a block diagram illustrating an electric control system for the braking system, which includes the braking pressure control apparatus and various electrically controlled elements connected to the braking pressure control apparatus.

The electric control system includes a pressure control device 160 as shown in the block diagram of FIG. 3. The pressure control device 160 is principally constituted by a computer incorporating a CPU 162, a ROM 164 and a RAM 166. The ROM 164 stores various control programs including those for executing a pump boosting control routine (post-boosting-limit control routine), an anti-lock pressure control routine, a front-rear braking-force distribution control routine, a braking effect control routine, a vehicle turning stability control routine, a vehicle running stability control routine, a traction control routine, an automatic braking control routine, and a pressurizing-device control routine illustrated in the flow chart of FIG. 8. The ROM 164 further stores control data such as an anti-lock control data map indicated in FIG. 4, a data map used to determine the amount of electric current to be applied to the pressure control valve 70, and a traction control data map used for the traction control routine. The CPU 162 operates to execute the control routines indicated above, according to the appropriate control programs stored in the ROM 164, while utilizing a temporary data storage function of the RAM 166.

The pressure control device 160 has an input portion 168 adapted to receive output signals of various switches and sensors such as an operating force sensor 199, an accelerator switch 200, a master-cylinder pressure sensor 201, a plurality of wheel speed sensors 202, load sensors 203, a longitudinal deceleration sensor 204, a lateral deceleration sensor 205, a yaw rate sensor 206, a steering angle sensor 207, and a distance sensor 208.

The operating force sensor 201 is provided to detect the force by which the brake pedal 10 is operated by the vehicle operator. The accelerator switch 201 is turned ON when an accelerator pedal is operated by the vehicle operator. The master-cylinder pressure sensor 201 is adapted to detect the hydraulic pressure in the second front pressurizing chamber 38 of the master cylinder 14. In this respect, it is noted that the hydraulic pressure in the pressurizing chamber 38 is a sum of a fluid pressure corresponding to the operating force acting on the brake pedal 10 (as boosted by the booster 12) and a fluid pressure generated by an operation of the pressurizing device 74 (namely, an output pressure of the pressurizing device 74, which is a fluid pressure in the rear pressurizing chamber 50). The wheel speed sensors 202 are provided for detecting the rotating speeds of the respective wheels 90L, 90R, 93L, 93R. The load sensors 203 are provided for the respective four wheels 90L, 90R, 93L, 90R, to detect the amounts of displacement of axle members to which the wheels 90 are attached, with respect to the body of the vehicle. The loads acting on the individual wheels 90 are calculated on the basis of the output signals of the load sensors 203, and the total load acting on the vehicle or the vehicle weight is calculated from the calculated wheel loads.

The longitudinal deceleration sensor 204 is adapted to detect the deceleration value of the vehicle in the longitudinal or running direction of the vehicle, while the lateral deceleration sensor 205 is adapted to detect the deceleration value of the vehicle in its lateral direction. The yaw rate sensor 206 is provided to detect the yaw rate of the vehicle, namely, the velocity of rotation of the vehicle about a vertical axis, and the steering angle sensor 207 is provided to detect the angle of rotation of the steering wheel of the vehicle. The distance sensor 208 is adapted to detect a distance between the vehicle on which the braking system in question is provided, and an object in front of the vehicle, for instance, another vehicle running in front of the vehicle in question. The distance sensor 208 may include a transmitter for transmitting a wave, and a receiver for receiving a component of the transmitted wave which is reflected by the object. The distance between the vehicle in question and the object can be obtained on the basis of the frequency of the transmitted wave and the frequency of the received component.

The pressure control device 160 also has an output portion 210 connected to the pressure-increasing pump motor 68 for the pump 66, the pump motors 106 for the two anti-lock pressure control pumps 104 in the two brake-application sub-systems, the coil 84 of the pressure control valve 70, and the coils 112 and 132 of the pressure-holding and pressure-reducing valves 110, 130 in the two brake-application sub-systems.

There will be described an operation of the hydraulically operated braking system constructed as described above.

While the brake pedal 10 is not in operation, the coils 70, 112, 132 are held in the de-energized state, while the pressure-increasing pump is held off. Upon operation of the brake pedal 10, the pressurizing pistons 32, 34 are accordingly advanced, and a hydraulic pressure corresponding to the operating force acting on the brake pedal 10 are generated in the front pressurizing chambers 36, 38. The generated hydraulic pressure is applied to the wheel brake cylinders 92 to operate the wheel brakes 91 for braking the automotive vehicle. In this case, the pressure-holding valves 110 and the pressure-reducing valves 130 for all of the wheel brake cylinders 92 are held open and closed, respectively.

When the master cylinder pressure $P_{MC}$ detected by the master-cylinder pressure sensor 204 has been raised to a critical value P0 corresponding to the boosting limit of the booster 12, a pump boosting control of the master cylinder pressure by the pressurizing device 74 is initiated according to the pump boosting control routine indicated above. The boosting limit is a point at which the boosting ratio of the booster 12 is reduced or at which a rate of increase of the hydraulic pressure in the wheel brake cylinders 92 with an increase in the operating force of the brake pedal 10 while the pressuring device 74 is not in operation is reduced. The pump boosting control of the master cylinder pressure (hydraulic pressure in the wheel brake cylinders 92) is initiated when the operating force of the brake pedal 10 has exceeded a value corresponding to the boosting limit of the booster 12 or the critical value P0. The pump boosting control is effected to permit the master cylinder pressure to increase after the boosting limit of the booster 12 has been reached at the critical point P0, such that the rate of increase of the master cylinder pressure after the boosting limit has been reached remains unchanged, that is, is equal to the rate of increase before the boosting limit has been reached, as is apparent from the graph of FIG. 6. The pump boosting control may be referred to as "post-boosting-limit control" of the master cylinder pressure.

In the pump boosting control, the pressure-increasing pump 66 is turned on, and the electric current applied to the pressure control valve 70 is controlled to regulate the hydraulic pressure in the rear pressurizing chamber 50 of the master cylinder 14. The pressurizing piston 32 is advanced by both the output force of the booster 12 based on the operating force of the brake pedal 10, and a force based on the pressure in the rear pressurizing chamber 50, so that the fluid pressure corresponding to the sum of these two forces is generated in the front pressurizing chambers 36, 38.

Figure 6:
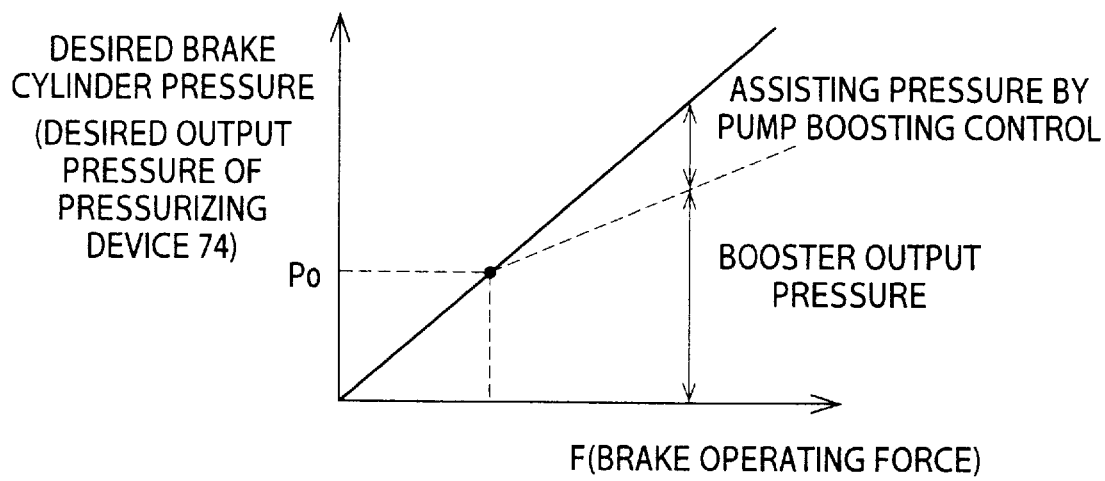
FIG. 6 is a graph indicating a relationship between an operating force of a brake operating member and a desired braking pressure of a wheel brake cylinder, which relationship is stored in the ROM of the braking pressure control apparatus.

In the present embodiment, the amount of electric current applied to the pressure control valve 70 is controlled so that the fluid pressure in the wheel brake cylinders 92 is controlled to a desired value determined by the operating force F of the brake pedal 10, as indicated in FIG. 6. The ROM 164 stores a control data map representative of a linear relationship between the output pressure P of the pressurizing device 74 and the electric current I to be applied to the coil 84 of the pressure control valve 70. This linear relationship is indicated by solid line in the graph of FIG. 7. The pressure control device 160 determines the desired value of the output pressure P of the pressurizing device 74 on the basis of the operating force F of the brake pedal 10 and according to the linear relationship of FIG. 6, and determines the desired amount of electric current I on the basis of the determined desired output pressure P of the pressurizing device 74 and according to the linear relationship indicated by the solid line in FIG. 7. The determined amount of electric current I is applied to the pressure control valve 70. While the pump boosting control is performed, the pressure-holding valves 110 and pressure-reducing valves 130 for all of the wheels 90 are held open and closed, respectively.

Figure 7:
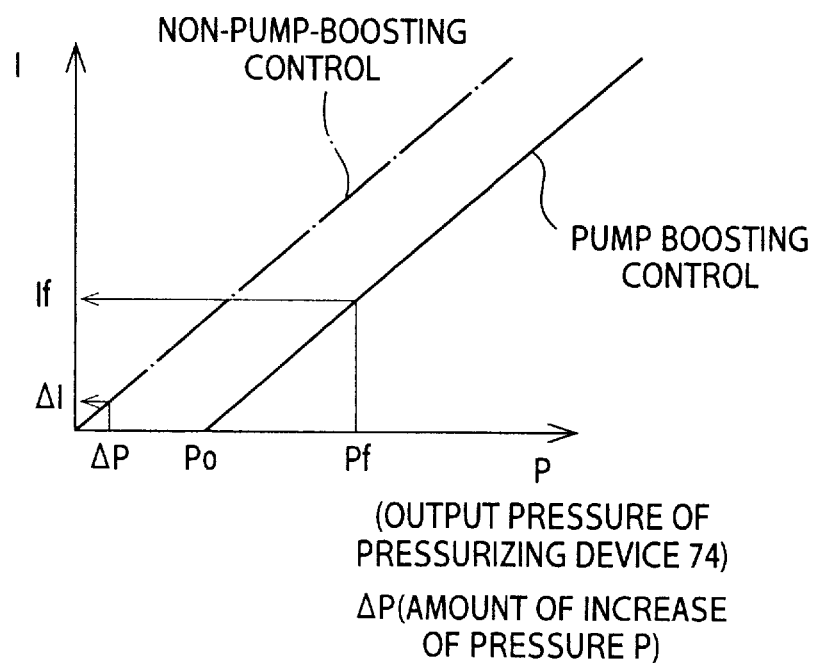
FIG. 7 is a graph indicating data maps which are stored in the ROM and which are used to determine the amount of electric current to be applied to the pressure control valve of the pressurizing device.

One-dot chain line in FIG. 7 indicates a linear relationship between the fluid pressure in the rear pressurizing chamber 50 and the electric current I when the brake pedal 10 is not in operation. This relationship is the same as a relationship between the output pressure P of the pressurizing device 74 and the electric current I applied to the pressure control device 70 when the brake pedal 10 is not in operation. In this state wherein no operating force acts on the brake pedal 10 and therefore on the pressurizing piston 32, the pressurizing piston 32 is advanced by only the force based on the fluid pressure in the rear pressurizing chamber 50, and the corresponding fluid pressure is generated in the front pressurizing chambers 36, 38. The one-dot chain line also indicates a relationship between the electric current I applied to the pressure control valve 70 and an amount of increase ΔP of the output pressure P of the pressurizing device 74 while the brake pedal 10 is in operation and before the boosting limit of the booster 12 has not been reached (before the pump boosting control is initiated), and also a relationship between an amount of increase ΔI of the electric current I and the amount of increase ΔP of the output pressure P after the boosting limit of the booster 12 has been reached as a result of operation of the brake pedal 10.

If the hydraulic pressure in any one of the wheel brake cylinders 92 has been increased to an upper limit determined by the friction coefficient of the surface of the roadway on which the vehicle is running, during the pump boosting control, an anti-lock pressure control is initiated for the wheel brake cylinder 92 in question, according to the anti-lock pressure control routine indicated above. In the anti-lock pressure control, the output pressure of the pressurizing device 74 is controlled according to the operating force of the brake pedal 10, and the pressure-holding valve 110 and pressure-reducing valve 130 of the pressure control valve device 133, 134, 135, 136 corresponding to the appropriate wheel brake cylinder 92 are suitably controlled (opened or closed) for controlling the hydraulic pressure of the wheel brake cylinder 92, so as to prevent an excessive slipping tendency of the corresponding wheel 90L, 90R, 93L, 93R.

During a normal braking operation, the total front braking force generated by the front wheel brakes 92 for the front wheels 90L, 90R and the total rear braking force generated by the rear wheel brakes 92 for the rear wheels 93L, 93R are controlled so as to establish a predetermined optimum distribution of the entire vehicle braking force to the front wheels 90L, 90R and to the rear wheels 93L, 93R.

The load acting on each of the front and rear wheels 90, 93 during brake application to the vehicle is determined by a static load acting on each wheel while the vehicle is stationary, and a dynamic load which is determined by a load shift during brake application. Described more specifically, the dynamic load is determined by the vehicle weight, the longitudinal deceleration during the brake application, and the particular construction of the vehicle. Due to the load shift, the load acting on the front wheels are generally made larger than that acting on the rear wheels. The desired total front braking force and the desired total rear braking force are determined on the basis of the determined loads acting on the front and rear wheels 90, 93 during the brake application. The desired or optimum distribution ratio (smaller than 1) of the total rear braking force is obtained by dividing the desired total rear braking force by the desired total front braking force. In the present embodiment, the rear-brake pressure control devices 135, 136 are commonly controlled so that the actual distribution ratio of the total front and rear braking forces approaches the optimum distribution ratio. Since the optimum distribution ratio of the total rear braking force is smaller than 1, the fluid pressure in the brake cylinders 92 for the rear wheels 93 is controlled to be lower than that in the brake cylinders 92 for the front wheels 90.

The braking system may be arranged to perform both a front-rear distribution control and a braking effect control so that the braking pressures in the wheel brake cylinders 92 for the front and rear wheels 90, 93 are controlled so as to establish the optimum front-rear distribution, and so as to achieve the vehicle deceleration (total vehicle braking force) as desired by the vehicle operator. The vehicle deceleration or total vehicle braking force desired by the vehicle operator is represented by the operating force of the brake pedal 10, while the optimum distribution ratio of the total rear braking force is determined by data indicative of the vehicle weight, longitudinal deceleration of the vehicle and the vehicle construction, as indicated above. On the basis of the desired total braking force and the optimum distribution ratio, the desired fluid pressure in the front wheel brake cylinders 92, the desired fluid pressure in the rear wheel brake cylinders 92, and the desired output pressure of the pressurizing device 74 are determined. A desired amount of change $\Delta P$ of the output pressure of the pressurizing device 74 can be obtained by calculating a difference between the desired and actual values of the output pressure of the pressurizing device 74, and the desired amount of change $\Delta I$ of the electric current I to be applied to the pressure control valve 70 can be obtained on the basis of the desired amount of change $\Delta P$ and according to the linear relationship indicated by the one-dot chain line in FIG. 7. The amount of electric current I to be applied to the valve 70 can be determined. The fluid pressure in the front wheel brake cylinders 92 for the front wheels 90L, 90R is controlled to be equal to the desired output pressure P of the pressurizing device 74, and the fluid pressure in the rear wheel brake cylinders 92 for the rear wheels 93L, 93R is controlled to be lower than that in the front wheel brake cylinders 92, by controlling the pressure control valve devices 135, 136.

The fluid pressure in the rear wheel brake cylinders 92 is controlled so as to approach the desired braking pressure, with the corresponding pressure-holding and pressure-reducing valves 110, 130 being controlled on the basis of the determined actual braking pressure value, the determined desired braking pressure value and the detected output pressure value of the pressurizing device 74 (fluid pressure as detected by the master-cylinder pressure sensor 201). The actual value of the braking pressure of the rear wheel brake cylinders 92 may be estimated from the detected vehicle deceleration value (as detected by the longitudinal deceleration sensor 204), or the distribution ratio of the total rear braking force to the total front braking force. Alternatively, the actual braking pressure to be used in the present control cycle may be determined to be the same as the desired braking pressure value used in the last control cycle. The actual braking pressure value may be actually detected by a pressure sensor provided for detecting the fluid pressure in the rear wheel brake cylinders 92.

Where it becomes necessary to brake the vehicle while the brake pedal 10 is not in operation, an "automatic brake" may be applied to the vehicle. For instance, where the distance between the vehicle and an object in front of the vehicle becomes shorter than a predetermined threshold, an automatic brake is applied to the vehicle. To this end, the desired deceleration value of the vehicle is determined on the basis of the distance between the vehicle and the object, and the desired braking pressure value is determined so that the desired deceleration value is established. The desired deceleration value is determined such that it increases with a decrease in the above-indicated distance, and the desired braking pressure value is determined such that it increases with an increase in the desired deceleration value. An effect of an engine brake if applied to the vehicle may be taken into account in determining the desired braking pressure value.

A determination as to whether an automatic brake should be applied to the vehicle, and/or a determination of the desired braking pressure value may be based on a rate of change (rate of decrease) of the distance between the vehicle and the object, or both the distance of the rate of change of the distance, rather than the distance alone. Alternatively, a derivative of the rate of change of the distance (a rate of increase of the speed at which the vehicle approaches the object) may also be taken into account in the above-indicated determination or determinations.

Upon application of an automatic brake to the vehicle, the pump device 64 is activated to increase the fluid pressure in the rear pressurizing chamber 50, so that the pressurizing piston 32 is advanced by a force based on the fluid pressure in the rear pressurizing chamber 50. As a result, a fluid pressure is generated in the front pressurizing chambers 36, 38, and the pressurized fluid is delivered from these chambers 36, 38 to the wheel brake cylinders 92. Thus, the vehicle is automatically braked without an operation of the brake pedal 10.

In the present embodiment, the output pressure of the pressurizing device 74 is controlled to be equal to the determined desired braking pressure.

The electric current I* to be applied to the pressure control valve 70 is determined according to the control data map representative of the linear relationship indicated by the one-dot chain line in FIG. 7, so that the output pressure of the pressurizing device 74 is made equal to the determined desired braking pressure. The electric motor 68 of the pump device 64 is controlled such that the duty of the motor 68 is initially kept at 100%, and is gradually reduced or zeroed as needed. With the duty cycle of the electric motor 68 being suitably controlled, the required amount of consumption of an electric energy by the electric motor 68 and the operating noise of the electric motor 68 can be made smaller than in the case where the duty is kept at 100% throughout the operation of the motor 68.

In principle, the solenoid coils 112, 132 of the pressure-holding and pressure-reducing valves 110, 130 of the pressure control valve device 133, 134, 135, 136 are held off. When the output pressure of the pressurizing device 74 is equal to the desired braking pressure of the wheel brake cylinder 92, the fluid pressure in the wheel brake cylinder 92 can theoretically be made equal to the desired braking pressure by holding the pressure-holding valve 110 in its open state and the pressure-reducing valve 130 in its closed state (by holding the wheel brake cylinder 92 in communication with the pressurizing device 74). Actually, however, the output pressure of the pressurizing device 74 is not always equal to the desired braking pressure. In view of this, the pressure-holding and pressure-reducing valves 110, 130 are controlled as needed, for instance, where the output pressure of the pressurizing device 74 is higher than the desired braking pressure. This control arrangement makes it possible to reduce the required number of operations and the operating noise of the pressure-holding and pressure-reducing valves 110, 130, and also permits an improvement of the braking pressure control accuracy.

If the brake pedal 10 is operated during the automatic brake application, the solenoid coils 112, 132 of the pressure-holding and pressure-reducing valves 110, 130 are de-energized to return these valves to their original states of FIG. 1. Further, the pump device 64 is turned off, and the solenoid coil 84 of the pressure control valve 70 is de-energized. As a result, the fluid pressure in the wheel brake cylinders 92 is controlled to a value corresponding to the operating force of the brake pedal 10 (corresponding to the output force of the booster 12).

Figure 10:
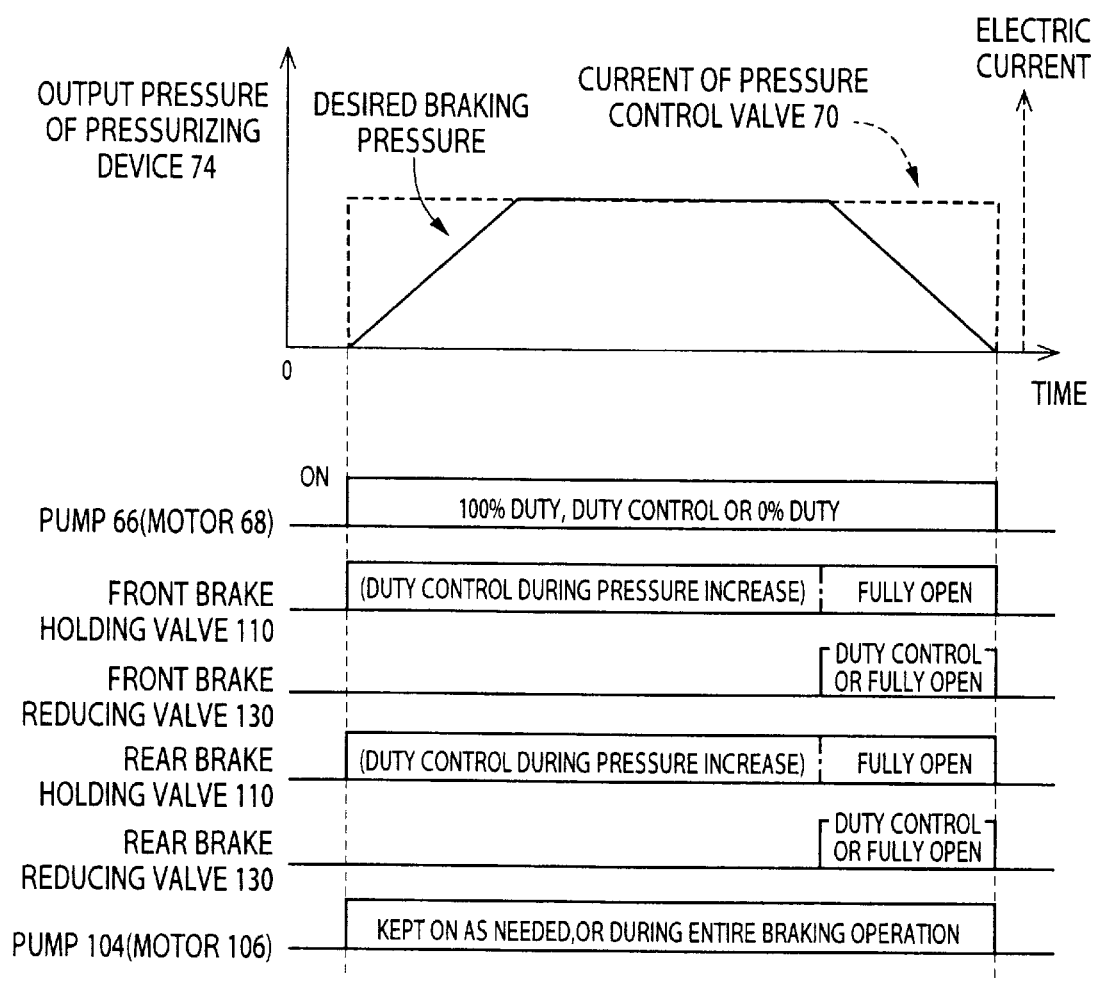
FIG. 10 is a graph corresponding to that of FIG. 9, when an automatic brake is applied to the vehicle under the control the braking pressure control apparatus in another mode of operation.

During the automatic brake application, the electric current I* applied to the pressure control valve 70 may be held constant, as indicated by broken line in FIG. 10. The electric current I* applied to the pressure control valve 70 is determined according to the control data map representative of the linear relationship indicated by one-dot chain line in FIG. 7 so that the output pressure of the pressurizing device 74 can be made equal to the determined desired braking pressure. The electric current applied to the electric motor 68 of the pump device 64 is controlled as described above.

The pressure-holding and pressure-reducing valves 110, 130 of each pressure control valve device 133–136 are controlled so that the actual fluid pressure in the corresponding wheel brake cylinder 92 is equal to the desired braking pressure. In the present embodiment, the pressure-holding valve 110 is primarily duty-controlled while the fluid pressure in the wheel brake cylinder 92 is being increased, and the pressure-reducing valve 130 is primarily duty-controlled while the fluid pressure in the wheel brake cylinder 92 is being reduced.

The manner of controlling the pressure-holding and pressure-reducing valves 110, 130 is not limited to that of FIG. 10. For instance, the actual fluid pressure in the wheel brake cylinder 92 is estimated from the detected deceleration value of the vehicle, and the valves 110, 130 are controlled in a feedback fashion so that the estimated fluid pressure is made equal to the desired braking pressure. Alternatively, the fluid pressure in the wheel brake cylinder 92 may be increased by controlling the pressure-reducing valve 130 while holding the pressure-holding valve 110 in the open state, or by controlling both of the pressure-holding and pressure-reducing valves 110, 130. Although the present embodiment is adapted such that the output pressure of the pressurizing device 74 is controlled to be equal to the desired braking pressure in a normal braking operation, this manner of control is not essential. The output pressure of the pressurizing device 74 may be controlled otherwise, provided that the fluid pressure in the wheel brake cylinder 92 is not insufficient.

If the drive force applied to the front drive wheels 90L, 90R becomes excessively large with respect to the friction coefficient of the road surface on which the vehicle is driven, the traction control is initiated to control the fluid pressure in the brake cylinders 92 for the front drive wheels 90L, 90R so that the amount of slipping of these drive wheels is held within an optimum range. The traction control is effected according to traction control data maps stored in the ROM 164, which data maps represent a predetermined relationship between the amount of slipping and deceleration value of the drive wheels 90L, 90R and a pressure control mode for the front wheel brake cylinders 92. Namely, an appropriate one of a pressure-increasing mode and a pressure-reducing mode is selected on the basis of the slipping amount and deceleration value of the front drive wheels 90L, 90R, so that the pressure-holding and pressure-reducing valves 110, 130 are controlled in the selected control mode.

Figure 11:
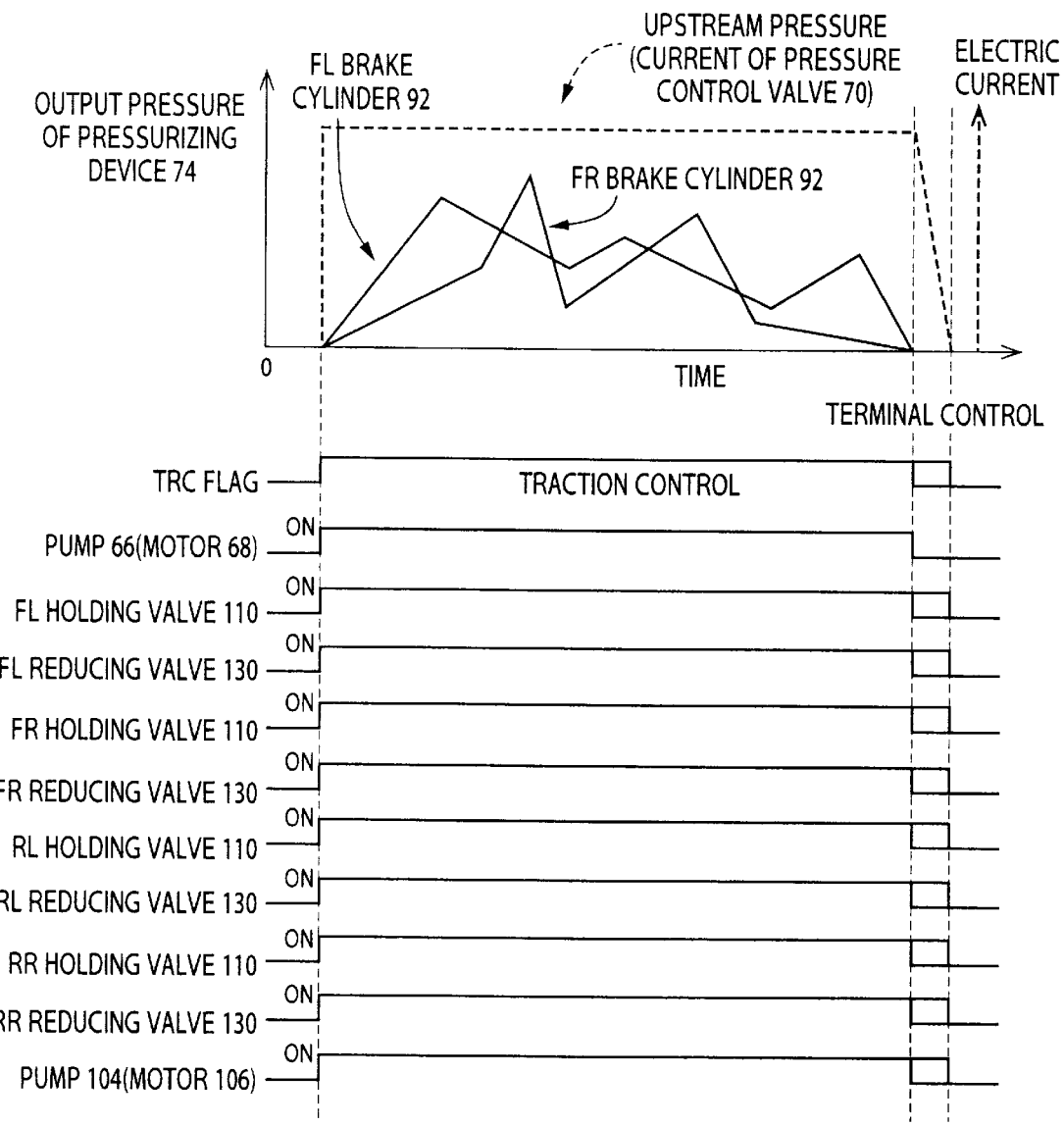
FIG. 11 is a graph indicating the output pressure of the pressurizing device and operations of the pressure control valve devices when a vehicle traction control is performed under the control of the braking pressure control apparatus in one mode of operation.

During the traction control, the electric current I* applied to the pressure control valve 70 of the pressuring device 74 is held constant, as indicated by broken line in FIG. 11, so that the output pressure of the pressurizing device 74 is made equal to a predetermined braking pressure P*. The electric current I* is determined according to the linear relationship indicated by one-dot chain line in FIG. 7. The predetermined braking pressure P* is determined so that the fluid pressures in the front wheel brake cylinders 92 are neither insufficiently low nor excessively high.

The fluid pressures in the brake cylinders 92 for the front drive wheels 90L, 90R are controlled independently of each other by controlling the pressure-holding and pressure-reducing valves 110, 130 of the respective pressure control devices 133, 134, so that the amounts of slipping of the drive wheels 90L, 90R are held within the optimum range. The pressure-holding and pressure-reducing valves 110, 130 may be duty-controlled as needed, and the pump 104 is kept operated.

During the traction control for the front drive wheels 90L, 90R, the pressure-holding and pressure-reducing valves 110, 130 for the rear driven wheels 93L, 93R may be both held in the closed state or in the open state, or alternatively held in the closed and open states, respectively. However, these valves 110, 130 for the rear wheels 93L, 93R may be controlled otherwise.

After the traction control is terminated, the pump 104 (electric motor 106) is kept operated for a predetermined time, to return the entire volume of the working fluid from the reservoir 120 back to the master reservoir 14. For the same predetermined time, the pressure-holding and pressure-reducing valves 110, 130 are held in the closed and open states, respectively.

Further, the electric current applied to the pressure control valve 70 is not abruptly reduced, but is gradually reduced, in order to reduce a shock or an abutting noise of the pressure control valve 70. The additional operation of the pump motor 106 for the predetermined time after the traction control and the gradual reduction of the electric current applied to the pressure control valve 70 after the traction control will be referred to as "post-traction-control control".

However, the post-traction-control control is not essential. That is, the working fluid can be returned from the wheel brake cylinders 92 for the front wheels 90L, 90R back to the master cylinder 14 through the pressure-holding valves 110, even if the pressure-holding and pressure-reducing valves 110, 130 are restored to their original open and closed states, respectively, upon termination of the traction control. It is also noted that either one of the gradual reduction of the electric current applied to the pressure control valve 70 and the continued or additional operation of the pump 104 may be effected after the traction control.

It is further noted that the pump 104 for pressurizing the fluid received from the reservoir 120 need not be kept operated for the entire period of the traction control, but may be operated only while the fluid pressure in at least one of the front wheel brake cylinders 92 is required to be reduced.

Figure 12:
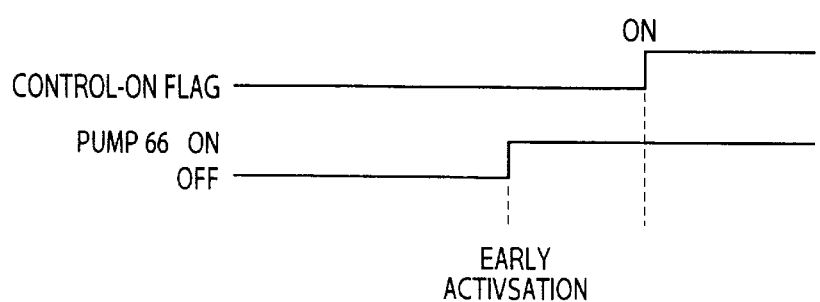
FIG. 12 is a graph corresponding to that of FIG. 11, when a vehicle traction control is performed under the control of the braking pressure control apparatus in another mode of operation.

The pump device 64 may be operated prior to the initiation of the traction control, as shown in FIG. 12. For instance, the electric motor 68 is activated to initiate a pumping operation of the pump 66 when the amount of slipping of one of the front wheels 90L, 90R has become larger than a predetermined threshold which is smaller than the threshold for initiating the traction control. According to this control arrangement, the pump 66 is operated to pressurize the fluid received from the master reservoir 58 while the pressure control valve 70 remains in the open state with its solenoid coil 84 being held in the de-energized state. As a result, the pressurized fluid delivered from the pump 66 is returned to the master reservoir 58, so that a pressurized fluid having a high pressure is not delivered from the pressurizing device 74.

By activating the pump device 64 prior to the initiation of the traction control as described above, the delay of the pressurizing device 74 to pressurize the fluid to the predetermined value P* upon initiation of the traction control can be minimized. This arrangement is effective to reduce the delay, particularly when the temperature of the working fluid is relatively low, and the viscosity of the fluid is relatively high. In this respect, it is noted that the requirement for braking the slipping drive wheels 90L, 90R is particularly high where the traction control is effected due to an excessively high friction coefficient of the road surface. In this case, the fluid pressure in the front wheel brake cylinders 92 is required to be relatively rapidly increased, or to be increased to a relatively high level. The early activation of the pump device 64 prior to the initiation of the traction control is effective in such a case.

The threshold of the amount of slipping of the front drive wheels 90L, 90R above which the early activation of the pump device 64 is effected may be a predetermined constant, or a variable which changes with the temperature or the friction coefficient $\mu$ of the road surface. The viscosity of the working fluid increases to increase the tendency of the above-indicated delay of the pressurizing device 74, as the temperature is lowered. That is, the threshold for the early activation of the pump 66 is reduced with a decrease in the temperature of the working fluid. In place of early activation of the pump device 64, the solenoid coil 84 of the pressure control valve 70 may be energized with a relatively small amount of electric current prior to the initiation of the traction control. In this case, the output pressure of the pressurizing device 74 is made higher by the corresponding amount, but the fluid pressurized by the pressurizing device 74 is less likely to be returned to the master reservoir 58, so that the delay in pressurizing the fluid to the predetermined level upon initiation of the traction control can be reduced, since the energization of the solenoid coil 84 of the pressure control valve 70 with a relatively small amount of electric current is also effective to reduce a clearance between the friction member and the rotor of the wheel brake 91.

Figure 13:
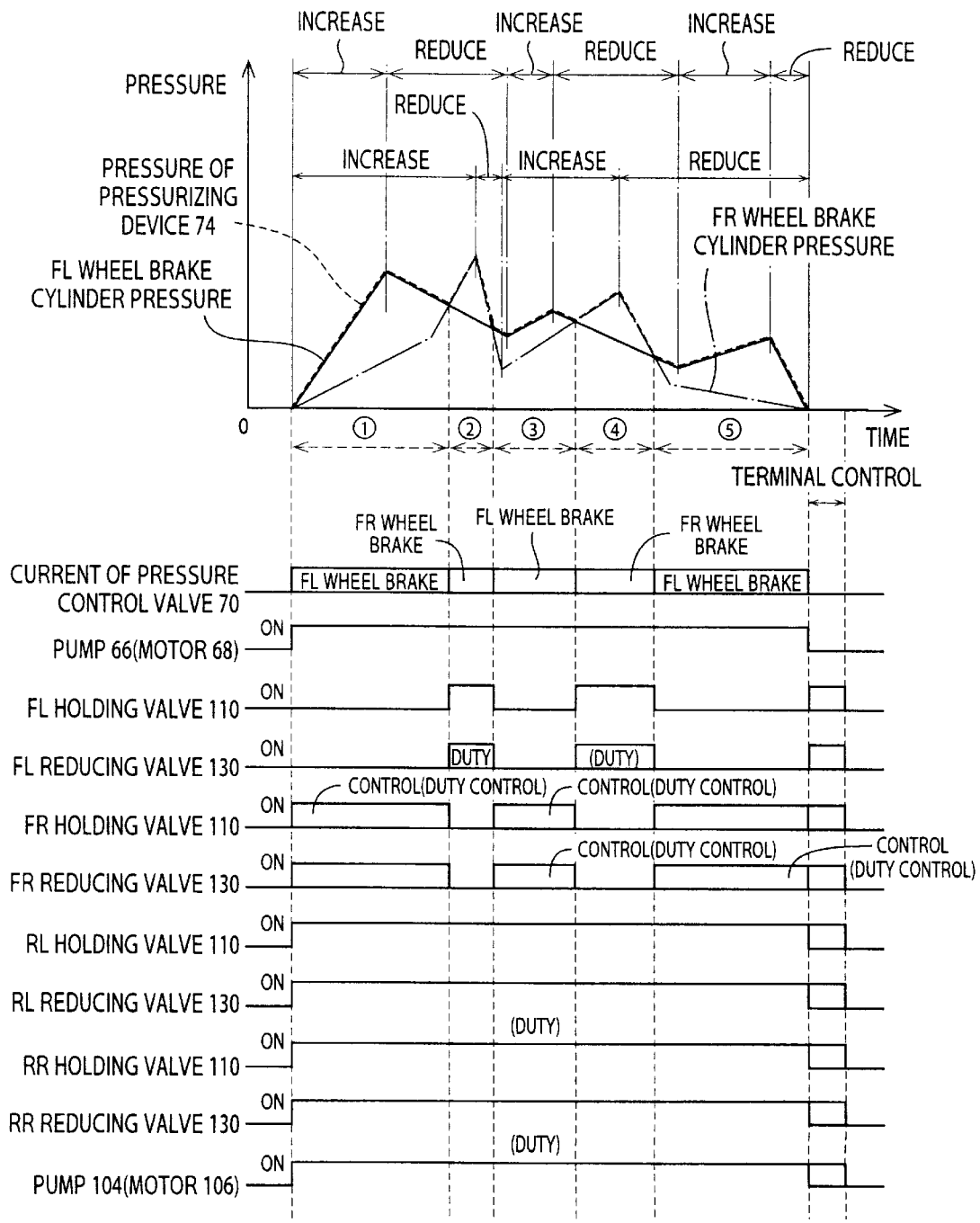
FIG. 13 is a graph corresponding to that of FIG. 11, when a vehicle traction control is performed under the control of the braking pressure control apparatus in a further mode of operation.

The output pressure of the pressurizing device 74 may be controlled to be equal to a higher one of the desired braking pressures of the two brake cylinders 92 for the front drive wheels 90L, 90R (a highest one of the desired braking pressures for the wheel brake cylinders 90, 93), as shown in FIG. 13. The same one of the two front wheel brake cylinders 92 does not always have the higher desired braking pressure, but one or the other of the two front wheel brake cylinders 92 has the higher desired braking pressure, depending upon the slipping states of the front drive wheels 90L, 90R.

Where the desired braking pressure values for the brake cylinders 92 for the drive wheels 90L, 90R are determined on the basis of the slipping states of these drive wheels, the actual output pressure of the pressurizing device 74 is controlled to be equal to the higher one of these two desired braking pressure values, by the pressure-holding and pressure-reducing valves 110, 130 corresponding to the drive wheels 90, 90R.

Where the wheel brake cylinder pressure is required to be increased while the output pressure of the pressurizing device 74 is higher than the desired braking pressure, the pressure-reducing valve 130 is closed, and the duty ratio or cycle of the pressure-holding valve 110 is controlled. Where the wheel brake cylinder pressure is required to be reduced, the pressure-holding valve 110 is closed, and the duty cycle of the pressure-reducing valve 130 is controlled. Where the output pressure of the pressurizing device 74 is equal to the desired braking pressure, the pressure-reducing valve 130 is closed, and the pressure-holding valve 110 is held in the open state (for communication between the wheel brake cylinder 92 and the pressurizing device 74), the wheel brake cylinder pressure is made equal to the desired braking pressure. By controlling the output pressure of the pressurizing device 74 such that the output pressure is equal to the desired braking pressure, the wheel brake cylinder pressure can be made equal to the desired braking pressure.

In a period ① indicated in FIG. 13, the output pressure of the pressurizing device 74 is controlled to be equal to the desired braking pressure for the drive wheel 90L, and the pressure-holding valve 110 and the pressure-reducing valve 130 of the pressure control valve device 133 for the drive wheel 90L are held in the open state and in the closed state, respectively. Thus, the pressure-holding and pressure-reducing valves 110, 130 remain in the original open and closed states, respectively, irrespective of whether the fluid pressure in the brake cylinder 92 for the drive wheel 90L is required to be increased or reduced. In other words, it is not necessary to control these valves 110, 130 since the output pressure of the pressurizing device 74 is controlled to be equal to the desired braking pressure.

In the traction control, the desired braking pressures for the front wheel brake cylinders 92 are not necessarily determined on the basis of the slipping states of the drive wheels 90L, 90R. In most cases, the fluid pressure in the front wheel brake cylinders 92 are suitably increased or reduced in order to hold the amounts of slipping of the drive wheels 90L, 90R in the optimum range. Described more specifically, a determination as to whether the fluid pressure of each front wheel brake cylinder 92 tends to be insufficient as compared with the output pressure of the pressurizing device 74 is effected on the basis of the operating state of the corresponding pressure-holding valve 110, and if the fluid pressure of one of the front wheel brake cylinder 92 is found insufficient, the output pressure of the pressurizing device 74 is controlled to increase the fluid pressure of that front wheel brake cylinder 92. Thus, the output pressure of the pressurizing device 74 can be controlled according to the higher one of the desired braking pressures for the two drive wheels 90L, 90R. In this embodiment, it is determined that the wheel brake cylinder pressure tends to be insufficient, if the duty of the pressure-holding valve 110 is higher than a predetermined upper limit, for instance, is equal to 100%. Alternatively, it is possible to determine that the wheel brake cylinder pressure tends to be insufficient, if the pressure-increasing mode has been established for more than a predetermined time.

In the above case, too, the pressure-increasing mode or the pressure-reducing mode is selectively established according to a traction control data map, and the pressure-holding and pressure-reducing valves 110, 130 are controlled in relation to the output pressure of the pressurizing device 74. The pressure-holding valve 110 and the pressure-reducing valve 130 corresponding to the front wheel brake cylinder 92 the pressure of which should be controlled by the pressurizing device 74 according to the higher desired braking pressure are held in the open state and in the closed state, respectively, and the valves 110, 130 corresponding to the other front wheel brake cylinder 92 are controlled in the same manner as shown in FIG. 11.

In the initial portion of the traction control, that is, in the period ① indicated in FIG. 13, for example, the desired braking pressure of the wheel brake cylinder 92 for the front left wheel 90L is higher than that of the wheel brake cylinder 92 for the front right wheel 90R, since the amount of slipping of the front left wheel 90L is larger than that of the front right wheel 90R. Accordingly, the output pressure of the pressurizing device 74 is controlled to optimize the slipping state of the front left wheel 90L.

When the fluid pressure of the wheel brake cylinder 92 for the front right wheel 90R then tends to be insufficient as compared with the output pressure of the pressurizing device 74, as a result of the control in the period ①, the duty ratio of the pressure-holding valve 110 corresponding to the front drive wheel 90R is increased. That is, in the period ② wherein the desired braking pressure of the wheel brake cylinder 92 for the front right wheel 90R is higher than that of the wheel brake cylinder 92 for the front left wheel 90L, the output pressure of the pressurizing device 74 is controlled in order to optimize the slipping state of the front right wheel 90R, namely, controlled to be equal to the desired braking pressure for the front right wheel 90R. This control in the period ② may cause the fluid pressure of the wheel brake cylinder 92 for the front left wheel 90L to be insufficient, as in the period ③. In this case, the output pressure of the pressurizing device 74 is controlled to optimize the slipping state of the front left wheel 90L. Thus, the output pressure of the pressurizing device 74 is controlled to be equal to a higher one of the desired braking pressure values of the front wheel brake cylinders 92.

Thus, the output pressure of the pressurizing device 74 is controlled to be equal to the highest one of the desired braking pressure values of the wheel brake cylinders 92. In this control arrangement, the required number of operations and the operating noise of the pressure-holding and pressure-reducing valves 110, 130 can be made smaller than in the control arrangement shown in FIG. 11 wherein the output pressure of the pressurizing device 74 is controlled to the predetermined value P*.

The vehicle turning stability control is effected when a difference of the actual yaw rate of the vehicle from the desired value has exceeded a predetermined threshold while the brake pedal 10 is not in operation. The desired value of the yaw rate may be obtained on the basis of the steering angle of the steering wheel and the vehicle speed. On the basis of the above-indicated difference, the desired yaw moment necessary to reduce the actual yaw rate to the desired value is obtained, and the desired braking pressure of each wheel brake cylinder 92 necessary to give the vehicle the desired yaw moment is obtained. The desired braking pressure of each wheel brake cylinder 92 permits a suitable difference between the total left braking force applied to the left wheels 90L, 93L and the total right braking force applied to the right wheels 90R, 93. In the vehicle turning stability control, the fluid pressures of the brake cylinders 92 of all of the four wheels may be suitably controlled, or alternatively the fluid pressures of the brake cylinders 92 for the front left and right drive wheels 90L, 90R or the rear left and right non-drive wheels 93L, 93R. In the vehicle turning stability control, the output pressure of the pressurizing device 74 is controlled to be equal to the predetermined value P*. However, the output pressure may be controlled to be equal to the highest one of the desired braking pressures of the four wheel brake cylinders 92.

When the vehicle running condition is deteriorated, the vehicle running stability control is initiated. Described in detail, when the degree of spinning of the vehicle as determined by the detected yaw rate, lateral deceleration value and running speed of the vehicle has exceeded a predetermined threshold, the fluid pressures in the wheel brake cylinders 92 for the front left and right wheels 90L, 90R are controlled so as to reduce the spinning tendency of the vehicle. To this end, the desired braking pressure values for the front wheels 90L, 90R are determined on the basis of the determined degree of spinning of the vehicle, and the pressure-holding and pressure-reducing valves 110, 130 of the pressure control valve devices 133, 134 are controlled independently of each other, to give the vehicle a yaw moment that reduces the spinning tendency.

When the degree of drift-out of the vehicle as determined by the detected yaw rate, steering angle and running speed of the vehicle has exceeded a predetermined threshold, the fluid pressures in the wheel brake cylinders 92 of the four wheels 90L, 90R, 93L, 93R are controlled so as to reduce the drift-out tendency of the vehicle. To this end, the desired braking pressure values for the four wheels 90, 93 are determined on the basis of the determined degree of drift-out of the vehicle, and the pressure-holding and pressure-reducing valves 110, 130 of the pressure control valve devices 133–136 are controlled independently of each other.

As described above, the pressure-holding and pressure-reducing valves 110, 130 are suitably opened and closed to regulate the fluid pressures in the wheel brake cylinders 92, in the various controls of the braking system such as the anti-lock pressure control, front-rear braking-force distribution control, automatic braking control, traction control, vehicle turning stability control and vehicle running stability control. When these controls are effected, the output pressure of the pressurizing device 74 may be undesirably influenced by the opening and closing actions of the pressure-holding and pressure-reducing valves 110, 130.

When the pressure-holding valve 110 of each pressure control valve device 133–136 is switched from its closed state for inhibiting the fluid flows between the pressurizing device 74 and the corresponding wheel brake cylinder 92, to its open state for permitting the fluid flow from the pressurizing device 74 into the wheel brake cylinder 92, the output pressure of the pressurizing device 74 is lowered due to the delivery of the pressurized fluid from the front pressurizing chambers 36, 38 of the master cylinder 14. When the pressure-reducing valve 130 is switched from its closed state to its open state, the fluid discharged from the wheel brake cylinder 92 is pumped by the pump 104 and returned to the master cylinder 14, so that the fluid pressure in the front pressurizing chambers 36, 38 is raised. Thus, the output pressure of the pressurizing device 74 is temporarily changed due to the switching actions or operating states of the pressure-holding and pressure-reducing valves 110, 130, that is, due to the fluid flows through these valves 110, 130. In view of this fact, the present braking pressure control apparatus is arranged to control the pump device 64 depending upon a change in the operating states of the pressure-holding and pressure-reducing valves 110, 130, so as to reduce the temporary or transient change of the output pressure of the pressurizing device 74 due to the switching actions of the pressure-holding and pressure-reducing valves 110, 130.

There will be described in detail an example of the above-indicated control of the pump device 64, which takes place in an anti-lock pressure control during the pump boosting of the fluid pressure of the master cylinder 14, that is, during an operation of the pump device 64 after the boosting limit of the booster 12 has been reached by a result of an operation of the brake pedal 10.

An anti-lock pressure control operation is initiated when a predetermined condition for initiating the anti-lock pressure control is satisfied, for instance, when the amount of slip of any one of the braked wheels 90, 93 has exceeded a predetermined threshold. The anti-lock pressure control operation is terminated when a predetermined condition for terminating the control is satisfied, for instance, when the vehicle has been brought to a stop.

The anti-lock pressure control is effected by opening and closing the pressure-holding and pressure-reducing valves 110, 130 in one of a pressure-increasing mode, a pressure-reducing mode and a pressure-holding mode, which is selected on the basis of the slipping state and acceleration value of the slipping wheel. Where the wheel acceleration value G is larger than a predetermined threshold G2 while the slipping amount Sw is not larger than a predetermined threshold Sw1, the pressure-increasing mode is selected, as indicated in FIG. 4, so that the pressure-holding valve 110 is opened while the pressure-reducing valve 130 is closed, whereby the braking pressure of the slipping wheel is increased. Where the wheel acceleration is smaller than a predetermined threshold G1 while the slipping amount Sw is not smaller than a predetermined threshold Sw2, the pressure-reducing mode is selected, as also indicated in FIG. 4, so that the pressure-holding valve 110 is closed while the pressure-reducing valve 130 is opened, whereby the braking pressure of the slipping wheel is reduced. In the other condition of the slipping wheel, the pressure-holding mode is selected, so that the pressure-holding and pressure-reducing valves 110, 130 are both held in the closed state, whereby the braking pressure of the slipping wheel is held constant.

The amount of electric current to be applied to the pressure control valve 70 of the pressurizing device 74 is principally controlled so that the output pressure of the pressurizing device 74 approaches a desired value corresponding to the operating force of the brake pedal 10. At the same time, however, the pressure control valve 70 is controlled depending upon the operating states of the pressure-holding and pressure-reducing valves 110, 130 which operating states determine the state of flows of the fluid through these valves between the pressurizing device 74 and the wheel brake cylinders 92. For instance, the pressure control valve 70 is controlled depending upon the switching actions of the pressure-holding and pressure-reducing valves 110, 130 which are expected to take place in the near future. Namely, a first or basic desired value of the output pressure of the pressurizing device 64 which is determined by the operating force of the brake pedal 10 is modified to a second or final desired value, when the switching actions of the valves 110, 130 are likely to take place in the near future, so that the actual output pressure of the pressurizing device 74 is controlled to approach the second or final desired value.

In the present embodiment, the second or final desired value of the output pressure of the pressurizing device 74 is made higher than the first or basic desired value corresponding to the operating force of the brake pedal 10, where the pressure-increasing mode is expected to be selected in the near future. In this case, the amount of electric current to be applied to the pressure control valve 70 is made larger than that corresponding to the operating force of the brake pedal 10, and the opening of the pressure control valve 70 is accordingly reduced. Where the pressure-reducing mode is expected to be selected in the near future, on the other hand, the final desired value of the output pressure of the pressurizing device 74 is made lower than that corresponding to the operating force of the brake pedal 10, and the amount of electric current to be applied to the pressure control valve 70 is made smaller than that corresponding to the operating force of the brake pedal 10, so that the opening of the valve 70 is accordingly increased. Thus, the control of the pressure control valve 70 is effected depending upon whether the pressure-increasing mode or pressure-reducing mode is likely to be selected within a predetermined short time. In other words, the above-indicated control of the valve 70 according to the second desired value is initiated upon detection of a symptom indicating that the pressure-increasing or pressure-reducing mode will be highly probably selected within the predetermined time.

Described more specifically, the final desired value of the output pressure of the pressurizing device 74 is made higher than the desired value corresponding to the operating force of the brake pedal 10, when a pressure-increasing symptom is detected. This pressure-increasing symptom is detected when the slipping amount Sw of the slipping wheel is not larger than a predetermined pressure-increasing symptom threshold Sw1* larger than the threshold Sw1 (used for selecting the pressure-increasing mode) while the acceleration value G of the slipping wheel is not smaller than a predetermined pressure-increasing symptom threshold G2* smaller than the threshold G2 (used for selecting the pressure-increasing mode), and when the slipping amount Sw is in the process of being reduced and/or when the wheel acceleration value G is in the process of being increased. When the pressure-increasing symptom is detected, the desired value of the output pressure of the pressurizing device 74 is gradually increased from the value corresponding to the operating force of the brake pedal 10 so that the valve 70 is gradually operated toward the fully closed state. When the slipping amount Sw of the slipping wheel has been subsequently reduced to the threshold Sw1 and the acceleration value G has exceeded the threshold G2, the pressure-increasing mode is selected, and the desired value of the output pressure of the pressurizing device 74 is held, for a predetermined time Tu, at a value which is larger by a predetermined amount ΔPu than that corresponding to the operating force of the brake pedal 10, as indicated in FIG. 5. Upon expiration of the time Tu, the desired value is gradually reduced to the value corresponding to the operating force of the brake pedal 10, so that the pressure control valve 70 is operated toward the fully open state.

Thus, when the pressure-increasing symptom is detected, the amount of electric current I to be applied to the pressure control valve 70 is increased from the value corresponding to the operating force of the brake pedal 10, to operate the valve 70 toward the fully closed state for thereby increasing the output pressure of the pressurizing device 74 prior to the subsequent opening action of the pressure-holding valve 110 to establish the pressure-increasing mode, so that the reduction of the output pressure of the device 74 in the pressure-increasing mode can be reduced.

On the other hand, the final desired value of the output pressure of the pressurizing device 74 is made lower than the desired value corresponding to the operating force of the brake pedal 10, when a pressure-reducing symptom is detected. This pressure-reducing symptom is detected when the slipping amount Sw of the slipping wheel is larger than a predetermined pressure-reducing symptom threshold Sw2* larger than the threshold Sw2 (used for selecting the pressure-reducing mode) while the acceleration value G of the slipping wheel is smaller than a predetermined pressure-reducing symptom threshold G1* smaller than the threshold G1 (used for selecting the pressure-reducing mode), and when the slipping amount Sw is in the process of being increasing and/or when the wheel acceleration value G is in the process of being reduced. When the pressure-reducing symptom is detected, the desired value of the output pressure of the pressurizing device 74 is gradually reduced from the value corresponding to the operating force of the brake pedal 10 so that the valve 70 is gradually operated toward the fully open state. When the slipping amount Sw of the slipping wheel has subsequently increased to the threshold Sw2 and the acceleration value G has been reduced to the threshold G1, the pressure-reducing mode is selected and the pressure-reducing valve 130 is opened. In this case, the desired value of the output pressure of the pressurizing device 74 is held, for a predetermined time Td, at a value which is smaller by a predetermined amount ΔPd than that corresponding to the operating force of the brake pedal 10, as also indicated in FIG. 5. Upon expiration of the time Td, the desired value is gradually increased to the value corresponding to the operating force of the brake pedal 10, so that the pressure control valve 70 is operated toward the fully closed state. Thus, when the pressure-reducing symptom is detected, the amount of electric current I to be applied to the pressure control valve 70 is reduced from the value corresponding to the operating force of the brake pedal 10, to operate the valve 70 toward the fully open state for thereby reducing the output pressure of the pressurizing device 74 prior to the subsequent opening action of the pressure-reducing valve 130 to establish the pressure-reducing mode, so that the increase of the output pressure of the device 74 in the pressure-reducing mode can be reduced.

Figure 8:
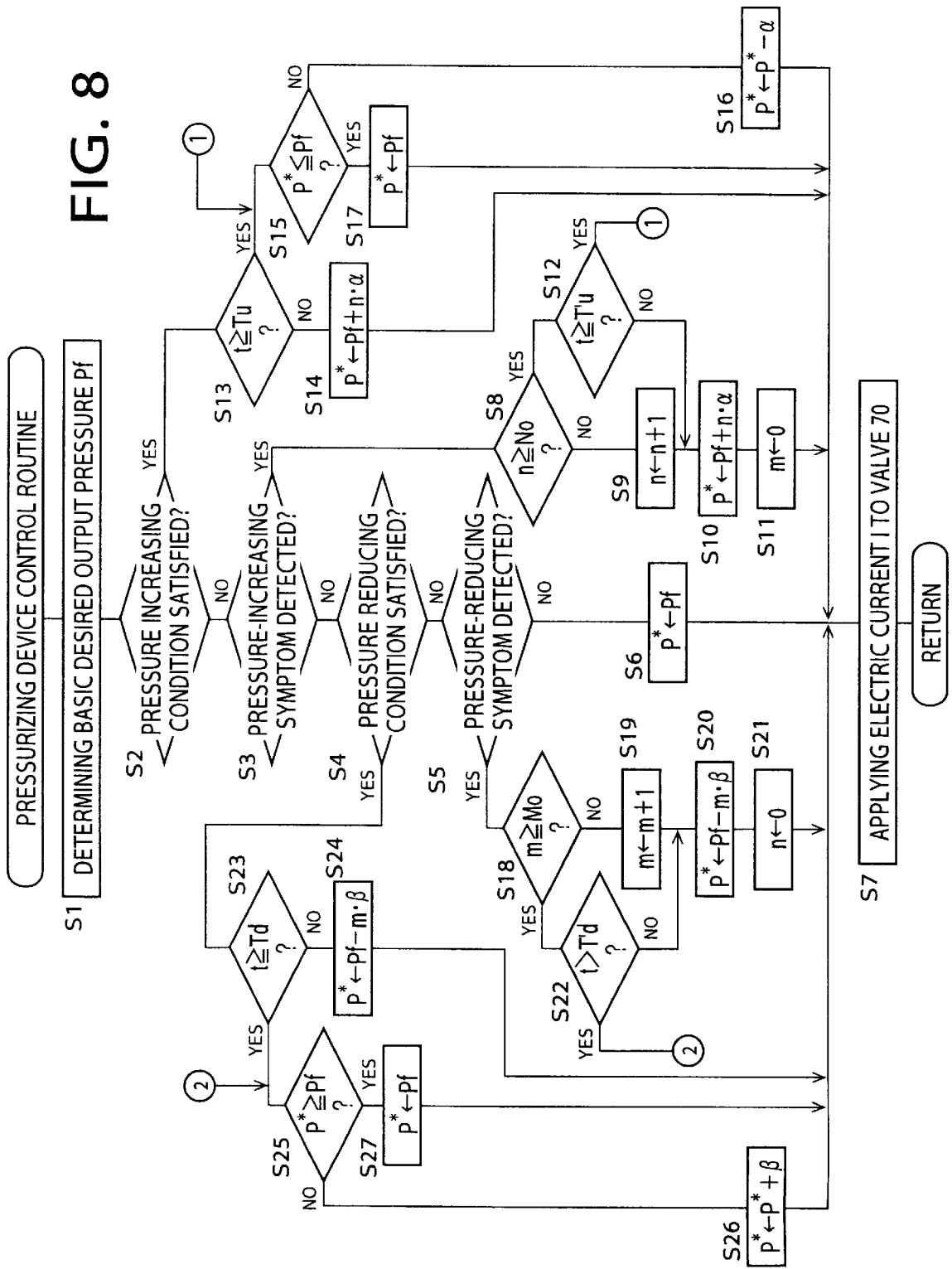
FIG. 8 is a flow chart illustrating a control program for executing a control routine for controlling the pressurizing device, which control program is stored in the ROM.
Figure 9:
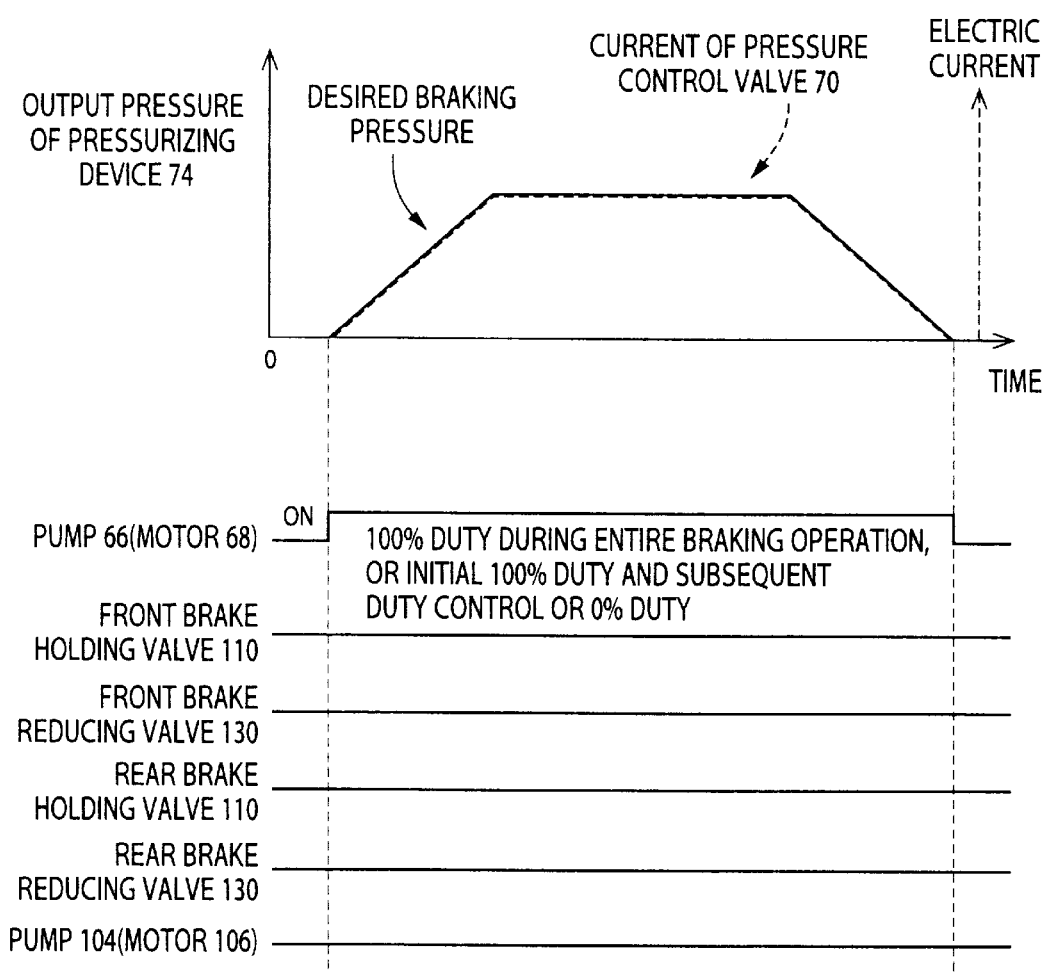
FIG. 9 is a graph indicating the output pressure of the pressurizing device, and operations of the pressure control valve devices when an automatic brake is applied to the vehicle under the control of the braking pressure control apparatus in one mode of operation.

Referring to the flow chart of FIG. 8, there will be described a control routine for controlling the pressurizing device 74, which is repeatedly executed with a predetermined cycle time for each of the four wheels 90, 93, while the anti-lock pressure control is effected during the pump boosting control in which the output pressure of the pressurizing device 74 is boosted by operation of the pump device 64 after the boosting limit of the booster 12 has been reached as a result of operation of the brake pedal 10. Namely, the control routine of FIG. 8 is formulated to reduce the influence of the anti-lock switching actions of the pressure-holding and pressure-reducing valves 110, 130 on the output pressure of the pressurizing device 74. According to this control routine, the pressure control valve 70 is controlled depending upon the expected switching actions of the valves 110, 130 which determine the state of the fluid flows between the wheel brake cylinder for each slipping wheel and the pressurizing device 74.

The control routine of FIG. 8 is initiated with step S1 to detect the operating force F acting on the brake pedal 10, and determine a first or basic desired value Pf of the output pressure of the pressurizing device 74. Step S1 is followed by step S2 to determine whether the pressure increasing condition is satisfied, that is, whether the pressure-increasing mode should be selected. If a negative decision (NO) is obtained in step S2, the control flow goes to step S3 to determine whether the pressure-increasing symptom indicated above is detected. If a negative decision (NO) is obtained in step S3, the control flow goes to step S4 to determine whether the pressure reducing condition is satisfied, that is, whether the pressure-reducing mode should be selected. If a negative decision (NO) is obtained in step S4, the control flow goes to step S5 to determine whether the pressure-reducing symptom indicated above is detected. If the negative decision (NO) is obtained in all of the steps S2–S5, the control flow goes to step S6 in which the first desired value Pf determined in step S1 is determined as the final desired value P*, and to step S7 in which the amount of electric current I to be applied to the solenoid coil 84 of the pressure control valve 70 is determined according to the control data map representative of the linear relationship indicated by solid line in FIG. 7, and the determined amount of electric current I is applied to the pressure control valve 70. In FIG. 7, the electric current I* applied to the valve 70 is equal to If corresponding to the basic desired value Pf which corresponds to the operating force F of the brake pedal 10.

When the pressure-increasing symptom is detected that is, when an affirmative decision (YES) is obtained in step S3, the control flow goes to step S8 to determine whether a count "n" of a pressure-increasing symptom counter has been increased to a predetermined value N0. If a negative decision (NO) is obtained in step S8, the control flow goes to step S9 to increment the count "n", and step S10 in which an amount of increase ΔP of the final desired value P* is obtained by multiplying the present count "n" by a predetermined increase coefficient α, and the final desired value P* is obtained by adding the obtained amount of increase ΔP=n·α to the basic desired value Pf Namely, P*=Pf+n·α. Step S10 is followed by step S11 in which a count "m" of a pressure-reducing symptom counter is reset to zero. Then, the control flow goes to step S7 in which the amount of electric current I determined on the basis of the final desired value P* is applied to the pressure control valve 70. The electric current I* applied to the valve 70 is equal to a sum of the value If corresponding to the basic desired value Pf and a value ΔI corresponding to the amount of increase ΔP. Namely, I*=If+ΔI. The amount of increase ΔI of the electric current is determined on the basis of the amount of increase ΔP of the desired pressure of the device 74, according to the linear relationship indicated by one-dot chain line in FIG. 7.

The pressure-increasing symptom counter and the pressure-reducing symptom counter are incremented each time the pressure-increasing symptom and the pressure-reducing symptom are detected, respectively, and the counts "n" and "m" of these counters are used to determine the amount of increase or decrease ΔP when the final desired value P* is gradually increased or reduced with respect to the basic desired value Pf corresponding to the operating force F of the brake pedal 10. The counts "n" and "m" are reset to 0 upon initialization of the pressure control device 160 (before initiation of the control routine of FIG. 8). Further, the count "m" of the pressure-reducing symptom counter is reset to 0 in step S11 when the pressure-increasing symptom is detected, as described above, and the count "n" of the pressure-increasing symptom counter is reset to 0 in step S21 when the pressure-reducing symptom is detected (when an affirmative decision is obtained in step S5).

Steps S1–S3, S8–S11 and S7 are repeatedly implemented to gradually increase the final desired value P* with respect to the basic desired value Pf while the pressure-increasing symptom is detected and before the pressure increasing condition is satisfied. When the count "n" has increased to the predetermined value N0, that is, when an affirmative decision (YES) is obtained in step S8, the control flow goes to step S12 to determine whether a predetermined time T'u which has passed after the pressure-increasing symptom was initially detected. If a negative decision (NO) is obtained in step S12, the control flow goes to step S10 in which the final value P* is set to be equal to Pf+n·α as described above. In this case, the count "n" is equal to the predetermined value N0. The final value P* remains to be equal to the sum of the basic value Pf (corresponding to the operating force of the brake pedal 10) and the constant amount of increase ΔPu N0·Δ, until the time T'd has passed.

If the pressure increasing condition is satisfied before the time T'd has passed after the pressure-increasing symptom was initially detected, an affirmative decision (YES) is obtained in step S2, and the control flow goes to step S13 to determine whether the predetermined time Td has passed after the pressure increasing condition was satisfied. If a negative decision (NO) is obtained in step S13, the control flow goes to step S14 in which the final value P* is set to be equal to Pf+ΔPu (=n·α). The amount of increase ΔPu is obtained by multiplying the count "n" at the time the pressure increasing condition is satisfied (during repeated implementation of steps S1–S3, S8–S12 and S7), by the predetermined coefficient α. If the pressure increasing condition is satisfied after the count "n" has reached the predetermined value N0, the amount of increase ΔPu is equal to N0·α. The amount of increase ΔPu or (n·α) increases with an increase of the time which has passed after the pressure-increasing symptom is detected and until the pressure increasing condition is satisfied.

When the predetermined time Tu has passed, an affirmative decision (YES) is obtained in step S13, and the control flow goes to steps S15 and S16 to gradually reduce the final desired pressure value P* until the final value P* has been reduced to the basic desired value Pf corresponding to the operating force F of the brake pedal 10 at that time. After the final desired pressure value P* has been reduced to the basic value Pf, steps S1, S2, S13, S15, S17 and S7 are repeatedly implemented so that the final value P* is kept at the basic value Pf in step S17 and the electric current I corresponding to the basic value Pf is applied to the pressure control valve 70, as long as the pressure increasing condition is satisfied, that is, as long as the pressure-increasing mode is established.

Steps S15–S17 are implemented also where the pressure increasing condition is not satisfied within the predetermined time Tu after the pressure-increasing symptom is detected, that is, where the affirmative decision (YES) is obtained in step S12. In this case, too, the final desired pressure value P* is gradually reduced to the basic value Pf.

Where the pressure-reducing symptom is detected and the pressure-reducing condition is established, the pressure control valve 70 is controlled in a manner similar to that described above with respect to the detection of the pressure-increasing symptom and the selection of the pressure-increasing mode. That is, when the pressure-reducing symptom is detected, the final desired value P* of the output pressure of the pressurizing device 74 is determined in step S20, so as to be equal the basic value Pf corresponding to the brake operating force F, minus the amount of decrease ΔPd which is equal to m·β, where "m" represents the count of the pressure-reducing symptom counter, while "β" represents a predetermined reducing coefficient. Step S20 is followed by step S21 to reset the count "m" of the pressure-reducing symptom counter. The count "m" is incremented up to a predetermined upper limit M0, so that the amount of decrease ΔPd of the final desired value P* is gradually reduced to M0·β. In step S7, the amount of electric current I to be applied to the solenoid valve 84 of the valve 70 is obtained by subtracting ΔI corresponding to the amount of decrease ΔPd from the electric current If corresponding to the provisional value Pf, and the thus obtained electric current (If–ΔPd) is applied to the coil 84.

The final desired pressure value P* is held at the value Pf–ΔPd for the predetermined time Td after the pressure reducing condition is satisfied, that is, until an affirmative decision (YES) is obtained in step S23. When the predetermined time Td has passed, the final desired pressure value P* is gradually increased in step S26 until the final desired pressure value P* has been increased to the basic value Pf, that is, until an affirmative decision (YES) is obtained in step S25.

As described above, the amount of electric current to be applied to the pressure control valve 70 is controlled depending upon the fluid flow between the pressurizing device 74 and the wheel brake cylinder 92 of each wheel 90, 93, which fluid flow is expected to take place in the near future, that is, depending upon the switching actions of the pressure-holding and pressure-reducing valves 110, 130 which are expected or likely to take place in the near future. This arrangement is effective to reduce the undesirable transient changes of the output pressure of the pressurizing device 74 upon switching actions of the valves 110, 130 to establish the pressure-increasing mode or the pressure-reducing mode during an anti-lock pressure control for the slipping wheel or wheels. Accordingly, the output pressure of the pressurizing device 74 during the anti-lock pressure control can be maintained at the basic value corresponding to the operating force of the brake pedal 10. Since the pressure control valve 70 is controlled before the pressure-increasing or pressure-reducing mode is established, that is, before the switching actions of the pressure-holding and pressure-reducing valves 110, 130, the changes of the output pressure of the pressurizing device 74 upon switching operations of the valves 110, 130 can be reduced in a short time, and the output pressure can be controlled with high accuracy, assuring high accuracy of control of the fluid pressure in the wheel brake cylinder 92 of the slipping wheel. Further, a change of the reaction force which may be applied to the brake pedal 10 due to the change of the output pressure of the pressurizing device 74 can be effectively reduced. Accordingly, the deterioration of the operating feel of the brake pedal 10 can be avoided.

Where the operating force of the brake pedal 10 is kept substantially constant during the anti-lock pressure control, the basic desired value Pf of the output pressure of the pressurizing device 74 is held substantially constant, so that the opening of the pressure control valve 70 is controlled as shown in FIG. 5.

There will next be described the front-rear braking-force distribution control and the braking effect control. The desired braking force required by the vehicle operator is obtained on the basis of the operating force of the brake pedal 10, and the distribution ratio of the rear total braking force to the front total braking force is obtained on the basis of the vehicle weight, longitudinal vehicle acceleration (deceleration) value and vehicle construction. Based on the obtained desired braking force and distribution ratio, the desired braking pressure of the front wheel brake cylinders 92, the desired braking pressure of the rear wheel brake cylinders 92, and the desired output pressure of the pressurizing device 74 are obtained.

The amount of electric current to be applied to the pressure control valve 70 is controlled so that the output pressure of the pressurizing device 74 coincides with the desired value P* described above. Further, the pump device 64 is controlled so that the difference obtained by subtracting the actual value of the output pressure of the pressurizing device 74 from the desired value is increased. Where the distribution control and the braking effect control are effected while the pump boosting control by the pump device 64 is effected, the amount of electric current to be applied to the pressure control valve 70 is increased by an amount determined according to the linear relationship represented by one-dot chain line in FIG. 7. Where the pump boosting control is not effected, the electric current determined according to the above-indicated linear relationship is applied to the pressure control valve 70.

For establishing the determined distribution ratio of the total rear braking force to the total front braking force, the pressure-holding valves 110 and the pressure-reducing valves 130 of the pressure control valve devices 133, 134 for the front wheels 90 are held in the open state and the closed state, respectively, and the fluid pressure in the brake cylinders 92 for the front wheels 90 is held equal to the output pressure of the pressurizing device 74. At the same time, the pressure-holding and pressure-reducing valves 110, 130 of the pressure control valve devices 135, 136 for the rear wheels 93 are controlled such that the fluid pressure in the brake cylinders 92 for the rear wheels 93 is lower than that in the front wheel brake cylinders 92, to reduce the total braking force of the rear wheels 93 as compared with the total braking force of the front wheels 90.

When a difference obtained by subtracting the actual fluid pressure in the rear wheel brake cylinders 92 from the desired value becomes larger than a predetermined difference value P1 (positive value), the pressure increasing condition is satisfied, and the pressure-increasing mode is established by opening the pressure-holding valves 110 of the pressure control valve devices 135, 136 for the rear wheels 93. When a difference obtained by subtracting the actual rear wheel brake cylinder pressure from the desired value determined in the present control cycle becomes smaller than a predetermined difference value P2 (negative value), the pressure reducing condition is satisfied, and the pressure-reducing mode is established by opening the pressure-reducing valves 130 of the pressure control valve devices 135, 136. The actual rear wheel brake cylinder pressure may be estimated from the longitudinal deceleration value G and the rear-front braking-force distribution ratio, or may be determined to be equal to the desired value determined in the last control cycle.

When the difference obtained by subtracting the actual rear wheel brake cylinder pressure from the desired value becomes larger than a predetermined pressure-increasing symptom threshold P1' (smaller than the above-indicated difference value P1) and when this difference is in the process of being increased, the pressure-increasing symptom is detected. When the above-indicated difference becomes smaller than a predetermined pressure-reducing symptom threshold P2' (the absolute value of which is smaller than the above-indicated difference value P1), the pressure-reducing symptom is detected. When the pressure-increasing symptom is detected, the opening of the pressure control valve 70 is gradually reduced to gradually increase the output pressure of the pressurizing device 74. When the pressure-reducing symptom is detected, the opening of the pressure control valve 70 is gradually increased to gradually reduce the output pressure of the pressuring device 74. Thus, the influence of the switching operations of the pressure-holding and pressure-reducing valves 110, 130 on the output pressure of the pressurizing device 74 in the front-rear braking-force distribution control is reduced in the same manner as described above with respect to the anti-lock pressure control.

The manner of gradually increasing or reducing the output pressure of the pressurizing device 74 in the front-rear braking-force distribution control is not limited to that described above. For instance, the pressure control valve 70 may be controlled on the basis of an amount or rate of change of the desired value of the rear wheel brake cylinder pressure, to gradually increase or reduce the output pressure of the pressurizing device 74 prior to the opening action of the pressure-holding or pressure-reducing valves 110, 130 in the front-rear braking-force distribution control.

As described above, the braking effect control and the front-rear braking-force distribution control according to the present braking pressure control apparatus are effected so as to reduce the undesirable change of the output pressure of the pressurizing device 74 upon opening actions of the pressure-holding and pressure-reducing valves 110, 130, so that the output pressure can be maintained at a value close to the desired value. This control arrangement permits adequate braking of the vehicle with the braking force as desired by the vehicle operator, and with the actual front-rear distribution ratio substantially following an ideal distribution curve.

While the operations to control the pressure control valve 70 so as to reduce the undesirable change of the output pressure of the pressurizing device 74 upon switching operations of the valves 110, 130 have been described above with respect to the anti-lock pressure control and the front-rear braking-force distribution control, similar control operations may be performed for the traction control, vehicle turning stability control and vehicle running stability control. When the brake pedal 10 is not in operation, a predetermined value is used as the desired value Pf of the output pressure of the pressurizing device 74. This predetermined value may be the same for the above-indicated difference controls, or may be different values for the respective different controls.

In the traction control illustrated in FIG. 11, the amount of electric current I* to be applied to the pressure control valve 70 is determined such that the output pressure of the pressurizing device 74 is made equal to the desired value Pf, and the determined electric current I* is maintained throughout the traction control. However, the electric current of the pressure control valve 70 may be feed-back controlled so that the fluid pressure in the master cylinder 14 as detected by the master-cylinder pressure sensor 201 is made equal to the desired value Pf. In this case, the actual output pressure of the pressurizing device 74 is held constant at the desired value Pf, irrespective of the operating states of the pressure-holding and pressure-reducing valves 110, 130, so that the actual output pressure is maintained at the desired value Pf upon switching actions of the valves 110, 130 to effect the traction control. In this sense, the feedback control indicated above may be considered to be effected on the basis of the operating states of the valves 110, 130 which determine the state of fluid flow between the front wheel brake cylinders 92 and the pressurizing device 74.

In the traction control described above by reference to FIG. 12, the pump device 64 is activated prior to the initiation of the control. This early activation of the pump device 64 may apply to the other controls such as the pump boosting control, the vehicle running stability control and the anti-lock pressure control.

It will be understood from the foregoing description of the present embodiment of this invention that portions of the pressure control device 160 assigned to execute the pressurizing-device control routine of the flow chart of FIG. 8 and store the control data maps of FIG. 7 for controlling the pressure control valve 70 constitute a pressurizing-device control device which controls the output pressure of the pressurizing device 74. It will also be understood that portions of the pressure control device 160 assigned to implement steps S2, S3 and S7–S17 of FIG. 8 constitute a pressure increase control portion of the pressurizing-device control device, while portions of the pressure control device 160 assigned to implement steps S4, S5, S7 and S18–S27 of FIG. 8 constitute a pressure reduction control portion of the pressurizing-device control device.

It will further be understood that portions of the pressure control device 160 assigned to store the control data maps of FIGS. 6 and 7 and implement step S7 constitute a pressure-reducing-valve control portion of the pressurizing-device control device, which control portion is adapted to control a pressure-reducing control valve in the form of the pressure control valve 70. This pressure-reducing-valve control portion includes a current control portion which controls an amount of electric current to be applied to the pressure-reducing valve 70. It will also be understood that portions of the pressure control device 160 assigned to implement steps S3, S5, S7–S10 and S18–S20 constitute a forecasting type control portion of the pressurizing-device control device, which control portion controls the output pressure of the pressurizing device 74 upon detection of a symptom indicating that the pressure control valve 133–136 is operated.

It will also be understood that portions of the pressure control device 160 assigned to store a control data map of FIG. 4 and implement steps S3 and S4 constitute a valve-device-state detecting device for detecting the operating state of the pressure control valve 133–136, and that portions of the pressure control device 160 assigned to control the pressure-holding and pressure-reducing valves 110, 130 constitute a valve-device control portion for controlling the control valve device 133–136. It will also be understood that portions of the pressure control device 160 assigned to control the output pressure of the pressurizing device 74 constitute an output pressure control portion for controlling the output pressure of the pressurizing device 74.

In the embodiment of FIG. 8, the pressure-increasing coefficient α and the pressure-reducing coefficient β are predetermined constant values. However, these coefficients α and β may be variables which are changed on the basis of the rate of change of the wheel acceleration or other parameter indicating the running condition of the vehicle when the pressure-increasing symptom or pressure-reducing symptom is detected. For instance, the coefficients α and β may be made larger when the rate of change of the wheel acceleration is relatively high, than when the rate of change is relatively low. In this case, the amount of increase ΔPu and the amount of decrease ΔPd of the final desired pressure value P* can be made relatively large even where the pressure-increasing or pressure-reducing condition is satisfied a relatively short time after the pressure-increasing or pressure-reducing symptom is detected. Although the amounts of increase and decrease ΔPu and ΔPd are changed with the count "n" in the embodiment of FIG. 8, these amounts may be predetermined constant amounts. Further, the amount of decrease ΔPd may be determined on the basis of the number of selections of the pressure-reducing mode in the anti-lock pressure control. Described in detail, when the pressure-reducing mode is selected for the first time in the anti-lock pressure control, the amount of fluid discharged from the wheel brake cylinder 92 is larger than when the pressure-reducing mode is selected for the second or subsequent time. Therefore, the amount of increase of the output pressure of the pressurizing device 74 upon establishment of the pressure-reducing mode for the first time is considered to be larger than that upon establishment of the pressure-reducing mode for the second or subsequent time. Accordingly, it is desirable to reduce the amount of decrease ΔPd with an increase in the number of selections of the pressure-reducing mode.

The pressurizing device 74 may be controlled in the present control operation on the basis of a pattern of control in the past control operations, for instance, on the basis of estimated patterns of change of the wheel brake cylinder pressure in the first, second and subsequent pressure-increasing operations and pressure-reducing operations. The desired pattern of control may be estimated based on the past fluid pressure change of one of the wheels or past fluid pressure changes of the two or more wheels.

In the embodiment described above, the determination as to whether there exist the pressure-increasing or pressure-reducing symptoms is based on the acceleration value G of the vehicle and the slipping amount Sw of the slipping wheel. However, the conditions for determining that there exists the symptom may include a condition that the rate of change of the slipping amount Sw is higher than a predetermined threshold, and/or a condition that the rate of change of the vehicle acceleration G is higher than a predetermined threshold. The use of these additional conditions increases the probability that the pressure-increasing mode or pressure-reducing mode will be actually selected and established within a given time where the pressure-increasing or pressure-reducing symptom is detected.

The manner of controlling the pressurizing device 74 based on the switching actions of the pressure-holding and pressure-reducing valves 110, 130 which are expected to take place in the near future is not limited to that described above by reference to FIG. 5. For example, the desired value of the output pressure of the pressurizing device 74 may be determined irrespective of the basic desired value Pf corresponding to the operating force of the brake pedal 10, during the time period Tu after the pressure-increasing mode is established, or during the time period Td after the pressure-reducing mode is established. Namely, the desired value of the output pressure of the pressurizing device 74 during the time period Tu may be the maximum pressure that can be produced by the pressurizing device 74. In this case, the maximum amount of electric current is applied to the pressure control valve 70 during the time period Tu. On the other hand, the desired value of the output pressure may be zero during the time period Td, so that no current is applied to the valve 70 during the time period Td. Alternatively, the desired value of the output pressure of the pressurizing device 74 may be determined on the basis of the running condition of the vehicle such as the wheel acceleration and slipping amount of the slipping wheel, or on the basis of the difference between the output pressure of the device 74 and the actual braking pressure of the wheel brake cylinders 72. The fluid pressure of the wheel brake cylinders 72 may be obtained on the basis of the output signal of the longitudinal acceleration sensor 204. The fluid pressure of the wheel brake cylinders 72 may be directly detected by a pressure sensor, which is provided for this purpose.

While the illustrated embodiment is arranged to control the output pressure of the pressurizing device 74 when the pressure-holding or pressure-reducing valve 110, 130 for each of the front wheels 90 is switched to the open state, as well as when the pressure-holding or pressure-reducing valve 110, 130 for each of the rear wheels 93 is switched to the open state, this control need not be effected for the rear wheels 93, since the braking capacity of the rear wheel brake cylinders 92 is smaller than that of the front wheel brake cylinders 92, and the opening actions of the valves 110, 130 for the rear wheels 93 are less likely to influence the output pressure of the pressurizing device 74. In this respect, it is noted that the amount of change of the past wheel brake cylinder pressure is estimated to be larger for the front wheels 90, than for the rear wheels 93, where the desired pattern of control of the pressurizing device 74 in the present control operation is estimated on the basis of the past pattern of control indicated above.

The pressurizing device 74 may be kept controlled as long as the pressure-increasing or pressure-reducing mode is established, such that the electric current to be applied to the pressure control valve 70 is feedback-controlled on the basis of the fluid pressure of the master cylinder 14 (output pressure of the pressurizing device 74) as detected by the master-cylinder pressure sensor 201 so that the detected master cylinder pressure coincides with the desired value corresponding to the operating force of the brake pedal 10. This control arrangement is effective to reduce an undesirable change of the output pressure of the pressurizing device 74 not only upon opening actions of the pressure-holding and pressure-reducing valves 110, 130, but also while these valves 110, 130 are held in the closed state.

Further, the pressure control valve 70 may be controlled on the basis of the fluid pressure in the rear pressurizing chamber 50, which is detected by a pressure sensor, which is provided for this purpose. In this respect, it is noted that the fluid pressure in the rear pressurizing chamber 50 is also influenced by the fluid flows between the pressurizing device 74 and the wheel brake cylinders 72. In the illustrated embodiment, the pressure-holding and pressure-reducing valves 110, 130 are simple shut-off valves. However, these valves 110, 130 may be replaced by linear solenoid valves capable of controlling the wheel brake cylinder pressure according to an amount of electric current applied thereto.

The pressurizing device 74 need not include the pressure control valve 70, since the output pressure of the pressurizing device 74 can be controlled by controlling the pump motor 68, rather than controlling the electric current applied to the pressure control device 70. That is, an undesirable reduction of the output pressure of the pressurizing device 74 upon opening action of the pressure-holding valve 110 can be reduced by increasing the amount of electric current to be applied to the pump motor 68 to thereby increase the operating speed of the pump 66, and an undesirable increase of the output pressure upon opening action of the pressure-reducing valve 130 can be reduced by reducing the amount of electric current to be applied to the pump 68 to thereby reduce the operating speed of the pump 66. It will also be noted that the output pressure of the pressurizing device 74 may be controlled by controlling the electric currents to be applied to the pressure control valve 70 and the pump motor 68.

It is noted that the pressure control valve 70 is not capable of controlling the output pressure of the pressurizing device 74 when the output pressure is lower than a given lower limit. While the output pressure is lower than this lower limit, the output pressure can be controlled by controlling the electric current to be applied to the pump motor 68. That is, the fluid pressure in the rear pressurizing chamber 50 can be increased as the amount of electric current to be applied to the pump motor 68 is increased to increase the delivery pressure of the pump 66. In this case, the pressure control valve 70 may be replaced by a pressure relief valve or a solenoid-operated shut-off valve. Where the pressure relief valve is provided, the fluid pressure in the rear pressurizing chamber 50 can be controlled by controlling the pump device 64 while the delivery pressure of the pump 66 is lower than a preset relief pressure of the relief valve. Where the solenoid-operated shut-off valve is provided, the fluid pressure in the rear pressurizing chamber 50 can be controlled by controlling the pump device 64 while the shut-off valve is in the closed state.

The control of the output pressure of the pressurizing device 74 need not be based on whether there exists a symptom indicating that the switching operations of the pressure control valve device 133–136 will highly probably take place. However, the desired value of the output pressure may be changed upon actual selection of the pressure-increasing or pressure-reducing mode. Further, the output pressure need not be controlled upon selection of each of the pressure-increasing and pressure-reducing modes, but may be controlled upon selection of only one of these two modes.

In the illustrated embodiment, the desired value of the output pressure of the pressurizing device 74 is changed in steps S10, S14, S20 and S24 to change the amount of electric current in step S7. However, the amount of electric current of the pressure control valve 70 may be directly changed to control the output pressure, without once determining the desired value of the output pressure.

Although the braking pressure control apparatus according to the illustrated embodiment is capable of performing all of the anti-lock pressure control, front-rear braking-force distribution control, braking effect control, traction control, vehicle turning stability control and vehicle running stability control, the apparatus need not be adapted to perform all of these controls, but may be adapted to perform at least one of these controls according to the principle of this invention.

Further, the apparatus may be adapted to perform a left-right braking-force distribution control for suitably controlling the ratio of the total left braking force to be generated by the brake cylinders 92 for the left wheels 90L, 93L and the total right braking force to be generated by the brake cylinders 92 for the right wheels 90R, 93R, with respect to each other, so as to assure a high degree of running stability of the vehicle during brake application. The left-right braking-force distribution control is effected for maximizing the total braking force to be generated by the brake cylinders 92 for all of the four wheels 90, 93, while taking into account a load shift during turning of the vehicle under braking.

Figure 14:
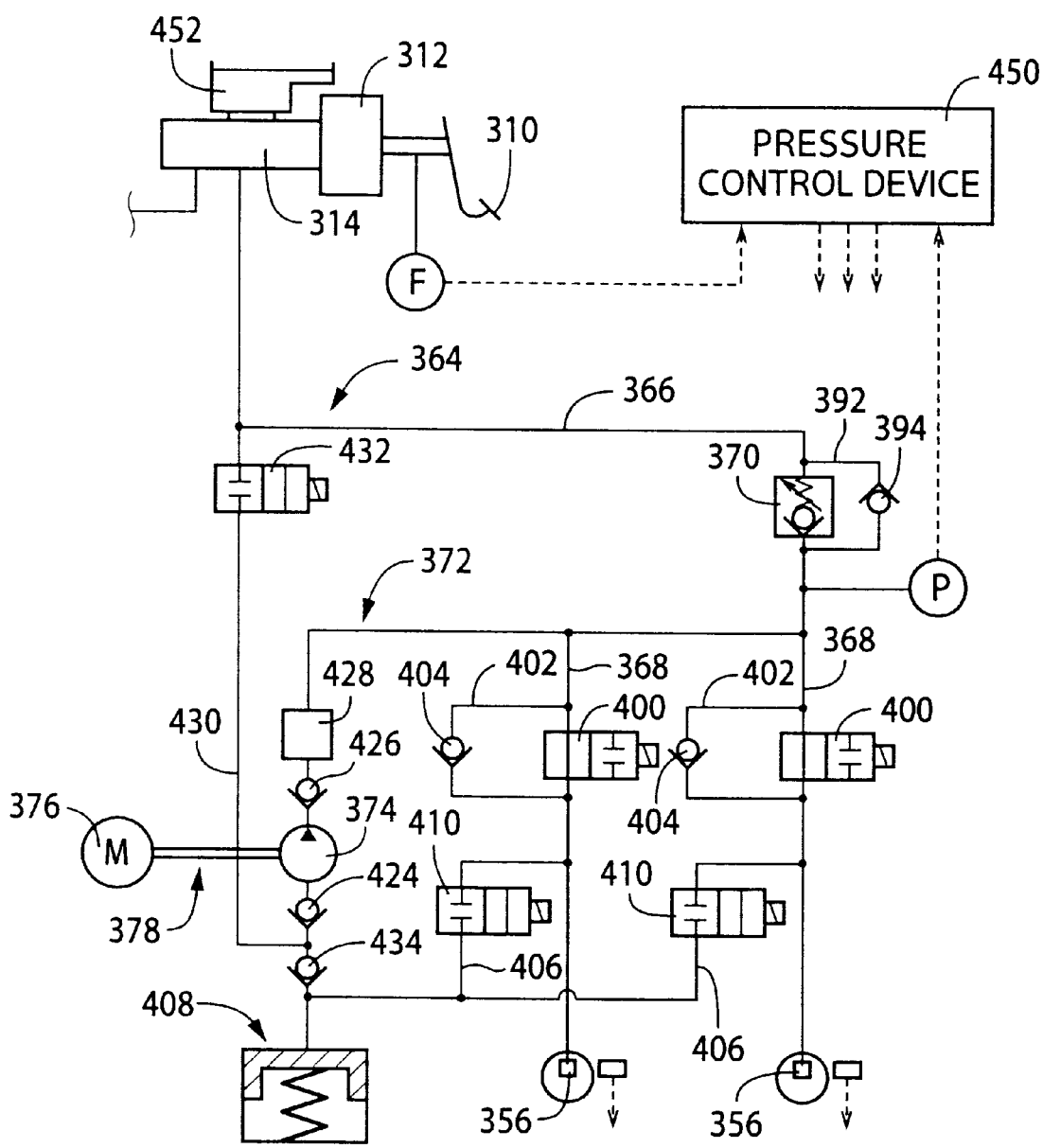
FIG. 14 is a schematic view showing a hydraulically operated braking system including a braking pressure control apparatus constructed according to another embodiment of this invention.

Referring next to FIG. 14, there is shown a hydraulically operated braking system for an automotive vehicle, which includes a braking pressure control apparatus constructed according to a second embodiment of this invention.

In FIG. 14, reference numeral 310 denotes a brake operating member in the form of a brake pedal, which is operatively connected to a master cylinder 314 through a vacuum booster 310 (hereinafter referred to simply as "booster 310"). The master cylinder 314 is of a tandem type having a housing and two pressurizing pistons which are slidably disposed in series in the housing and which cooperate with the housing to define two mutually independent pressurizing chambers in front of the respective pistons. When the brake pedal 310 is operated, the mater cylinder 314 is mechanically operated to generate in the two pressurizing chambers the same fluid pressure which corresponds to an operating force acting on the brake pedal 310.

The braking system shown in FIG. 13 has two brake application sub-systems for a front pair of wheel and a rear pair of wheels, respectively. Since these two sub-systems are identical with each other, only the front wheel sub-system will be described.

In the front wheel sub-system, one of the two pressurizing chambers of the master cylinder 314 is connected through a main fluid passage 364 to two front wheel brake cylinders 356 for operating two front wheel brakes 354 for respective front left and right wheels FL, FR of the vehicle. The main fluid passage 364 extending from the master cylinder 314 consists of a common passage 366 and two branch passages 368. A pressure control valve 370 is provided in the common passage 366, and he wheel brake cylinders 356 are connected to the respective branch passages 368. A pump passage 372 is connected to a portion of the main fluid passage 364 between the pressure control valve 370 and the wheel brake cylinders 356. A pump 374 is connected to the pump passage 372. The pump 374 is operated by a pump motor 376. The pump 374, the pump motor 376 and the pressure control valve 370 constitute a major portion of a pressurizing device 378.

The pressure control valve 370 is identical in construction with the pressure control valve 70 provided in the first embodiment. However, the pressure control valve 370 is provided in the common passage 366 such that the valve member 80 receives a force F2 based on a difference between fluid pressures in the master cylinder 314 and the wheel brake cylinders 356.

The pressure control valve 370 is provided with a by-pass passage 392 in which is disposed a by-pass valve 394 in the form of a check valve. The by-pass valve 394 permits a flow of the fluid from the master cylinder 314 to the wheel brake cylinders 356 during operation of the brake pedal 310, even if the pressure control valve 370 is closed due to a mechanical sticking of the valve member 80 or due to a fluid pressure acting on a movable member of the valve 370.

A pressure-holding valve 400 in the form of a normally open solenoid-operated shut-off valve is provided in a portion of each branch passage 368 between the corresponding wheel brake cylinder 356 and a point of connection of the branch passage 368 to the pump passage 372. Each pressure-holding valve 400 is provided with a by-passage 402 in which is disposed a by-pass valve 404 in the form of a check valve, which permits a fluid flow from the wheel brake cylinder 356 to the pump passage 372.

A reservoir passage 406 is connected at one end thereof to a portion of each branch passage 368 between the wheel brake cylinder 356 and the pressure-holding valve 400, and at the other end to a reservoir 408. A pressure-reducing valve 410 in the form of a normally closed solenoid-operated shut-off valve is provided in the reservoir passage 406. The reservoir 408 is connected to the main fluid passage 364 through the pump passage 372.

The pump passage 372 is provided with a suction valve 424, a discharge valve 426 and a damper chamber 430.

A supply passage 430 is connected at one end thereof to a portion of the pump passage 372 between the suction valve 424 and the reservoir 408, and at the other end to a portion of the main fluid passage 364 between the master cylinder 314 and the pressure control valve 370. The supply passage 430 is provided with an inflow control valve 432 in the form of a solenoid-operated shut-off valve. A check valve 434 is provided in a portion of the pump passage 372 between the reservoir 408 and a point of connection of the pump passage 372 to the supply passage 430. The check valve 434 is provided to inhibit a flow of the fluid from the master cylinder 314 to the reservoir 408 while the inflow control valve 432 is open. Thus, the check valve 434 permits the fluid pressurized by the master cylinder 314 to be supplied to the pump 374 without a pressure drop.

The control system for the present braking system of FIG. 14 is substantially the same as that of the first embodiment. The control system includes a pressure control device 450 which controls the amounts of electric current to be applied to the pressure-holding valves 400, pressure-reducing valves 410 and pressure control valve 370 and pump motor 376.

While the brake pedal 310 is not in operation, an electric current is not applied to the pressure control valve 370, and the pressure-holding and pressure-reducing valves 400, 410 are held in the states indicated in FIG. 14.

Upon operation of the brake pedal 310, the master cylinder 314 generates the fluid pressure corresponding to the operating force F acting on the brake pedal 310, and the thus generated fluid pressure is applied to the wheel brake cylinders 356, 360 to operate the wheel brakes 354, 358. When the fluid pressure detected by the master cylinder pressure sensor 452 has increased to a value corresponding to the boosting limit of the booster 312, the pump boosting control of the wheel brake cylinder pressure is initiated by opening the inflow control valve 432, and operating the pump 374, so that the fluid pressurized by the master cylinder 314 is pressurized by the pump 374, and the thus pressurized fluid is delivered from the pump 374 to the wheel brake cylinders 356. Thus, the output pressure of the pressurizing device 378 is supplied to the wheel brake cylinders 356. The fluid pressure in the wheel brake cylinders 356 is controlled by controlling the pressure control valve 370 such that the fluid pressure in the wheel brake cylinders 356 approaches the desired braking pressure corresponding to the operating force of the brake pedal 310.

When any one of the wheels has an excessively high slipping or locking tendency during the brake application described above, the braking system is operated in an anti-lock pressure control mode, such that the fluid pressures in the wheel brake cylinders 356 are controlled independently of each other by suitably opening and closing the corresponding pressure-holding valves 400 and pressure-reducing valves 410, so as to hold the amounts of slipping of the wheels in an optimum range.

When any one of the two drive wheels has an excessively large slipping tendency while the brake pedal 310 is not in operation, a traction control is performed. In the traction control, the pressurizing device 378 is activated to pressurize the fluid received from the master cylinder 314, and the thus pressurized fluid is supplied to the brake cylinders 356 for the slipping drive wheels. The output pressure of the pressurizing device 374 is controlled by the pressure control valve 370 such that the output pressure is held at a predetermined value. At the same time, the fluid pressures in the wheel brake cylinders 356 are controlled independently of each other by the controlling corresponding pressure-holding and pressure-reducing valves 400, 410.

The braking pressure control apparatus according to the present second embodiment is also arranged to effect the vehicle running stability control, the vehicle turning stability control, the front-rear braking force distribution control, the braking effect control and the left-right braking force distribution control.

In the present second embodiment, too, the amount of electric current applied to the pressure control device 370 is controlled on the basis of the operating states of the pressure-holding and pressure-reducing valves 400, 410, as in the first embodiment, so as to reduce the influence of the opening and closing actions of the valves 400, 410 on the output pressure of the pressurizing device 370.

Although the second embodiment is adapted to operate the pump 374 to pressurize the fluid received from the master cylinder 314, the pump 374 may be operated to pressurize the fluid received from the master reservoir 452. It is also noted that the pressure control valve 370 is not essential. Where the pressure control valve 370 is not provided, controlling the pump motor 376 is the only way of controlling the output pressure of the pressurizing device 378.

It is to be understood that the present invention may be embodied with various other changes, modifications and improvements, such as those described in the SUMMARY OF THE INVENTION, which may occur to those skilled in the art.

What is claimed is:

1. A braking pressure control apparatus for a braking system having a plurality of brake cylinders, comprising:
   a pressurizing device capable of pressurizing a working fluid and controlling a pressure of the pressurized fluid;

a plurality of pressure control valve devices each of which is disposed between said pressurizing device and at least one of said plurality of brake cylinders and is operable to control flows of said fluid between said pressurizing device and the corresponding at least one brake cylinder, for thereby regulating the fluid pressure in the corresponding at least one brake cylinder; and a pressurizing-device control device operable to control said pressurizing device for controlling an output pressure of said pressurizing device, on the basis of an operating state of each of said plurality of pressure control valve devices, which operating state determines a state of flow of the fluid between said pressurizing device and said corresponding at least one brake cylinder.

2. A braking pressure control apparatus according to claim 1, wherein said pressurizing-device control device includes a valve-device-state detecting portion operable to detect the operating state of said each pressure control valve device, said pressurizing-device control device controlling said pressurizing device on the basis of the operating state detected by said valve-device-state detecting portion.

3. A braking pressure control apparatus according to claim 1, further comprising a valve-device control portion operable to control said each pressure control valve device on the basis of a running condition of an automotive vehicle on which said braking system is provided.

4. A braking pressure control apparatus according to claim 1, further comprising a valve-device control portion operable for controlling said each pressure control valve device such that pressures of the fluid in said corresponding at least one brake cylinder are controlled to be lower than said output pressure of said pressurizing device.

5. A braking pressure control apparatus according to claim 1, wherein said pressurizing-device control device includes a pressure sensor for detecting said output pressure of said pressurizing device, at a position between said pressurizing device and said pressure control valve devices, said pressurizing-device control device controlling said pressurizing device on the basis of said output pressure as detected by said pressure sensor.

6. A braking pressure control apparatus according to claim 5, wherein said pressurizing device includes (a) a pump device operable to pressurize the working fluid, and (b) a master cylinder including a cylinder housing, and a pressurizing piston which is fluid-tightly and slidably fitted in said cylinder housing and which cooperates with said cylinder housing to define a rear pressurizing chamber connected to said pump device and a front pressurizing chamber connected to said corresponding at least one brake cylinder, said pressurizing piston being advanced by an increase in the pressure of the pressurized fluid which is supplied from said pump device into said rear pressurizing chamber, so that the pressure in said front pressurizing chamber is increased, and wherein said pressure sensor includes at least one of a sensor for detecting the pressure of the fluid in said front pressurizing chamber, and a sensor for detecting the pressure of the fluid in said rear pressurizing chamber.

7. A braking pressure control apparatus according to claim 1, wherein said pressurizing-device control device includes a pressure increase control portion operable to increase said output pressure of said pressurizing device when an amount of the fluid to be supplied into said at least one brake cylinder corresponding to each of said plurality of pressure control valve devices tends to be increased by said each pressure control valve device, and a pressure reduction control portion operable to reduce said output pressure of said pressurizing device when an amount of the fluid to be discharged from said at least one brake cylinder corresponding to said each pressure control valve device tends to be increased by said each pressure control valve device.

8. A braking pressure control apparatus according to claim 1, wherein said pressurizing-device control device includes a first control portion operable to control said output pressure of said pressurizing device on the basis of a condition of an automotive vehicle on which said braking system is provided, and a second control portion operable to control said output pressure on the basis of the operating state of said each pressure control valve device.

9. A braking pressure control apparatus according to claim 1, wherein said pressurizing device includes a pressurizing portion for pressurizing the working fluid, and a pressure-reducing control valve capable of controlling said output pressure of said pressurizing device by reducing the pressure of the fluid pressurized by said pressurizing portion, and wherein said pressurizing-device control device includes a pressure-reducing-valve control portion operable to control said pressure-reducing control valve on the basis of said state of flow of the fluid between said pressurizing device and said corresponding at least one brake cylinder.

10. A braking pressure control apparatus according to claim 9, wherein said pressure-reducing control valve is a solenoid-operated linear control valve capable of controlling the pressure of the fluid pressurized by the pressurizing portion to a value corresponding to an amount of electric current applied thereto, and wherein said pressure-reducing-valve control portion includes an electric current control portion for controlling the electric current to be applied to said solenoid-operated linear control valve.

11. A braking pressure control apparatus according to claim 1, wherein said pressurizing device comprises a pump device including a pump for pressuring the working fluid, and a pump drive source for driving said pump, and said pressurizing-device control device includes a pressurizing-capacity control portion operable to control a pressurizing capacity of said pump device on the basis of said operating state of said each pressure control valve device which determines the state of flow of the fluid between said pressurizing device and said corresponding at least one brake cylinder.

12. A braking pressure control apparatus according to claim 11, wherein said pump drive source is an electric motor, and said pressurizing-capacity control portion includes a speed control portion operable for controlling an operating speed of said electric motor.

13. A braking pressure control apparatus according to claim 1, wherein said pressurizing-device control device controls said pressurizing device according to a highest one of desired values of the fluid pressures in said plurality of brake cylinders.

14. A braking pressure control apparatus according to claim 1, further comprising a valve-device control portion operable to control each of said plurality of pressure control valve devices for regulating the fluid pressure in said corresponding at least one brake cylinder, and wherein said pressurizing-device control device includes a constant-pressure control portion operable to control said pressurizing device such that said output pressure is held at a predetermined constant value.

15. A braking pressure control apparatus according to claim 1, wherein said pressurizing device includes:

a pump device operable to pressurize said working fluid; and a master cylinder including a cylinder housing, and a pressurizing piston which is fluid-tightly and slidably fitted in said cylinder housing and which cooperates with said cylinder housing to define a rear pressurizing chamber connected to said pump device and a front pressurizing chamber connected to said corresponding at least one brake cylinder, said pressurizing piston being advanced by an increase in the pressure of the pressurized fluid which is supplied from said pump device into said rear pressurizing chamber, so that the pressure in said front pressurizing chamber is increased.

16. A braking pressure control apparatus for a braking system having a plurality of brake cylinders, said braking pressure control apparatus comprising:

a pressurizing device capable of pressurizing a working fluid and controlling a pressure of the pressurized fluid:

a plurality of pressure control valve devices each of which is disposed between said pressurizing device and at least one of said plurality brake cylinders and is operable to control flows of said fluid between said pressurizing device and the corresponding at least one brake cylinder, for thereby regulating the fluid pressure in the corresponding at least one brake cylinder; and a pressurizing-device control device for controlling said pressurizing device to control an output pressure of said pressurizing device, said pressurizing-device control device including a forecasting type control portion operable to initiate an operation of controlling said output pressure of said pressurizing device upon detection of a symptom indicating that each of said pressure control valve devices will be operated within a predetermined time to initiate a flow of the fluid between said pressuring device and said corresponding at least one brake cylinder.

17. A braking pressure control apparatus according to claim 16, wherein said forecasting type control portion includes a running-condition forecasting portion operable on the basis of a running condition of an automotive vehicle on which said braking system is provided, to forecast whether a switching operation of said each pressure control valve device will take place to initiate said flow of the fluid.

18. A braking pressure control apparatus according to claim 16, wherein said pressurizing device includes:

a pump device operable to pressurize said working fluid; and a master cylinder including a cylinder housing, and a pressurizing piston which is fluid-tightly and slidably fitted in said cylinder housing and which cooperates with said cylinder housing to define a rear pressurizing chamber connected to said pump device and a front pressurizing chamber connected to said corresponding at least one brake cylinder, said pressurizing piston being advanced by an increase in the pressure of the pressurized fluid which is supplied from said pump device into said rear pressurizing chamber, so that the pressure in said front pressurizing chamber is increased.

19. A braking pressure control apparatus for a braking system having a plurality of brake cylinders, said braking pressure control apparatus comprising:

a pressurizing device including a pump device operable to pressurize a working fluid, and a master cylinder having a cylinder housing, and a pressurizing piston which is fluid-tightly and slidably fitted in said cylinder housing and which cooperates with said cylinder housing to define a rear pressurizing chamber connected to said pump device and a front pressurizing chamber connected to said corresponding at least one brake cylinder, said pressurizing piston being advanced by an increase in the pressure of the pressurized fluid which is supplied from said pump device into said rear pressurizing chamber, so that the pressure in said front pressurizing chamber is increased;

a plurality of pressure control valve devices each of which is disposed between said pressurizing device and at least one of said plurality of brake cylinders and is operable to control flows of said fluid between said pressurizing device and the corresponding at least one brake cylinder, for thereby regulating the fluid pressure in the corresponding at least one brake cylinder, for thereby regulating the fluid pressure in the corresponding at least one brake cylinder; and a control device operable to control at least one of said pressurizing device and each of said plurality of pressure control valve devices, for thereby regulating the fluid pressure in said corresponding at least one brake cylinder.

20. A braking pressure control apparatus according to claim 19, wherein said pressurizing device further includes a pressure-reducing control valve capable of controlling the pressure of the fluid pressurized by said pump device, and wherein said control device activates said pump device prior to an operation of said each pressure control valve device is initiated to regulate the fluid pressure in said corresponding at least one brake cylinder, said control device controlling said pressure-reducing control valve such that said output pressure of said pressurizing device after activation of said pump device does not exceed a value before activation of said pump device.

21. A braking control apparatus for a braking system having a plurality of brake cylinders, said braking control apparatus comprising:

a pressurizing device capable of pressurizing a working fluid and controlling a pressure of the pressurized fluid to a desired basic value;

a plurality of pressure control devices which are disposed between said pressurizing device and said plurality of brake cylinders, respectively and each of which is operable to control flows of said fluid between said pressurizing device and a corresponding one of said brake cylinders, for thereby regulating the fluid pressure in said corresponding brake cylinder; and a pressurizing-device control device including at least one of a pressure-increase control portion and a pressure-reduction control portion, said pressure-increase control portion being operable to control said pressurizing device such that an output pressure of said pressurizing device is controlled to a value higher than said desired basic value when at least one of said plurality of pressure control valve devices is operated to supply said pressurized fluid to the corresponding brake cylinder, said pressure-reduction control portion being operable to control said pressurizing device such that said output pressure is controlled to a value lower than said desired basic value when at least one of said plurality of pressure control valve devices is operated to discharge the pressurized fluid from the corresponding brake cylinder.

* * * * *